United States Patent
Tzanidis et al.

(10) Patent No.: US 9,001,917 B2
(45) Date of Patent: Apr. 7, 2015

(54) METHOD AND APPARATUS FOR MINIATURIZATION OF MIMO SYSTEMS VIA TIGHTLY COUPLED ANTENNA ARRAY

(71) Applicant: Samsung Electronics Co., Ltd., Suwon-si, Gyeonggi-do (KR)

(72) Inventors: Ioannis Tzanidis, Dallas, TX (US); George Zohn Hutcheson, Richardson, TX (US); Yang Li, Plano, TX (US); Jungsuek Oh, Fairview, TX (US); Wonbin Hong, Seoul (KR); Gary Xu, Allen, TX (US); Jianzhong Zhang, Plano, TX (US)

(73) Assignee: Samsung Electronics Company., Ltd., Suwon-Si (KR)

( * ) Notice: Subject to any disclaimer, the term of this patent is extended or adjusted under 35 U.S.C. 154(b) by 0 days.

(21) Appl. No.: 14/269,962

(22) Filed: May 5, 2014

(65) Prior Publication Data
US 2014/0334565 A1  Nov. 13, 2014

Related U.S. Application Data

(60) Provisional application No. 61/822,251, filed on May 10, 2013, provisional application No. 61/827,329, filed on May 24, 2013.

(51) Int. Cl.
*H04B 7/02* (2006.01)
*H04L 1/02* (2006.01)
*H04B 7/04* (2006.01)

(52) U.S. Cl.
CPC .................................. *H04B 7/0456* (2013.01)

(58) Field of Classification Search
USPC .......................................................... 375/302
See application file for complete search history.

(56) References Cited

U.S. PATENT DOCUMENTS 8,253,645 B2 *  8/2012  Derneryd et al. ............. 343/853
2007/0049347 A1  3/2007  Jin et al.
(Continued)

FOREIGN PATENT DOCUMENTS

KR  2006-0036225 A  4/2006

OTHER PUBLICATIONS

International Search Report dated Aug. 11, 2014 in connection with International Patent Application No. PCT/KR2014/004174, 3 pages.
(Continued)

*Primary Examiner* — Erin File

(57) ABSTRACT

In a Multiple Input Multiple Output (MIMO) system, an apparatus and method includes a Tightly Coupled Array antennas (TCA) or Current Sheet Antennas (CSA). Far-field radiation patterns from any current sheet antenna are formed from the combination of the fields generated by a set of currents on the CSA of array port orthogonal modes, such as the Characteristic Modes (CM). The CM currents are generated by excitation of the CSA element ports with corresponding orthogonal voltages or currents (eigenvectors). Since the radiation patterns of the characteristic modes are orthogonal and uncorrelated, multiple signals may be propagated along the radiation patterns of the characteristic modes, each signal using a different characteristic mode or a different set of characteristic modes. Therefore, a CSA antenna utilizing array port orthogonal modes such as array port characteristic modes can support MIMO communications despite the strong mutual coupling among the antenna elements.

14 Claims, 20 Drawing Sheets

(56) References Cited

U.S. PATENT DOCUMENTS

| | | |
|---|---|---|
| 2009/0262852 A1 | 10/2009 | Orlik et al. |
| 2010/0117908 A2* | 5/2010 | Lee et al. ............... 343/700 MS |
| 2012/0093200 A1 | 4/2012 | Kyeong |
| 2012/0139810 A1 | 6/2012 | Faraone et al. |
| 2012/0328037 A1* | 12/2012 | Hsu et al. ...................... 375/267 |
| 2013/0244594 A1* | 9/2013 | Alrabadi et al. ................ 455/78 |

OTHER PUBLICATIONS

Written Opinion of International Searching Authority dated Aug. 11, 2014 in connection with International Patent Application No. PCT/KR2014/004174, 4 pages.

* cited by examiner

Examples of Tightly Coupled Array Systems

Examples of Tightly Coupled Array Systems on Base Station

Examples of Tightly Coupled Array Systems on User Equipment

Calculation of CM excitation coefficients

- Array S-matrix is measured between all elements. One element transmits all others receive.
- S-matrix is converted to Z-matrix via $Z = Z_0^{1/2}(U-S)^{-1}(U+S)Z_0^{1/2}$

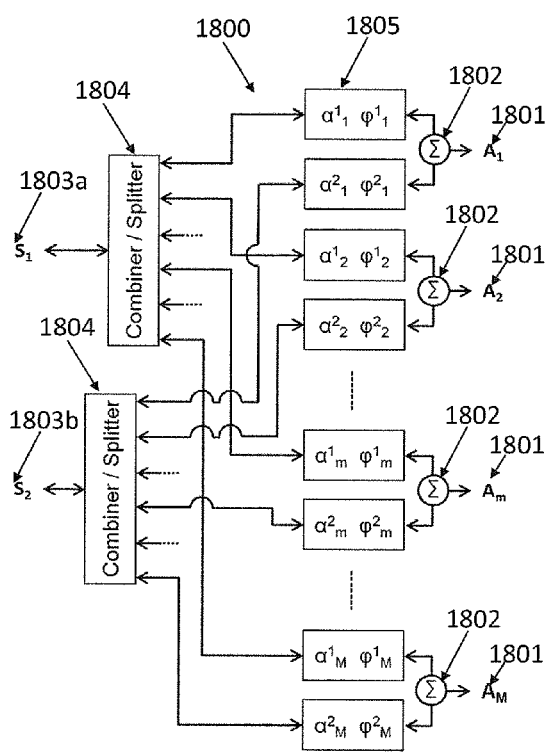
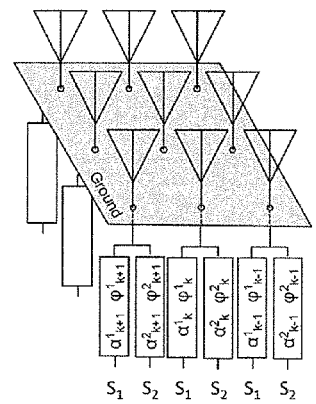
Current Sheet Antenna with Excitations for Characteristic Modes Supporting MIMO
Figure 18B
Figure 18A Implementation of CM excitation coefficients

US 9,001,917 B2

METHOD AND APPARATUS FOR MINIATURIZATION OF MIMO SYSTEMS VIA TIGHTLY COUPLED ANTENNA ARRAY

This application incorporates by reference the content of U.S. Provisional Patent Application Ser. No. 61/822,251, filed May 10, 2013, entitled "Method and Apparatus for Miniaturization of FD-MIMO Systems via Tightly Coupled Antenna Array and MU-MIMO Precoding" and U.S. Provisional Patent Application Ser. No. 61/827,329, filed May 24, 2013, entitled "Current Sheet Antennas for MIMO Applications." The above-identified provisional patent applications are hereby incorporated by reference in their entirety.

TECHNICAL FIELD

The present disclosure relates to Full Dimension Multiple Input Multiple Output (FD-MIMO) systems with multiple active antennas at transmitter (base station), a receiver (user station), or both.

BACKGROUND

Recently, a new Multiple-Input-Multiple-Output (MIMO) system, called the Full-dimensional MIMO (FD-MIMO), has shown great potential to improve the spectral efficiency of the current Long Term Evolution (LIE) networks. The FD-MIMO system applies a large number of active antenna elements arranged in a two-dimensional manner at the Base-Station (BS). The antenna array is capable of beamforming in both azimuth and elevation directions, and capable of providing sufficient degrees of freedom to support high order MultiUser MIMO (MU-MIMO).

SUMMARY

This disclosure provides a system and method for transmitting control information associated with scheduling data in communication systems with aggregation of one or more TDD cells with one or more FDD cells.

In a first embodiment, a method is provided. The method is configured to generate Multiple Input Multiple Output (MIMO) signals in a wireless propagation channel using antenna array port Characteristic Modes. The method includes acquiring an antenna array port scattering matrix S at a first frequency. The method also includes calculating, a set of antenna array port orthogonal modes, wherein the set of antenna array port orthogonal modes include an antenna array port characteristic mode based on antenna array port scattering matrix S at a first frequency. In addition, the method includes ordering the characteristic modes at a first frequency based on system performance criteria. The system performance criteria includes one or more of: a maximum modal significance parameter α, a maximum radiation efficiency, a maximum SINR at the user, a minimum interference at the user, and a maximum capacity. The method also includes deriving antenna array port excitation coefficients at a first frequency from the antenna array port characteristic modes at a first frequency. Further, the method includes applying the antenna array port excitation coefficients as antenna array port excitation weights.

In a second embodiment, an apparatus is provided. The apparatus is configured to generate Multiple Input Multiple Output (MIMO) signals using antenna array port Characteristic Modes. The apparatus includes an antenna array including at least two tightly coupled antennas at a first frequency. Each of the at least two tightly coupled antennas includes at least one active port. The active port comprising a terminal connected to at least one of a transmit chain or a receive chain. The at least one of transmit chain or receive chain includes an assembly that includes: a baseband unit with a processor and memory, DAC/ADC converters, a frequency mixer, an attenuator, a PA/LNA, a switch, a filter, a matching circuit, a balun configured to enforce excitation and impedance matching at the at least one antenna array port.

In a third embodiment, an apparatus is provided. The apparatus includes processing circuitry configured to generate Multiple Input Multiple Output (MIMO) signals in a wireless propagation channel using antenna array port Characteristic Modes. The apparatus also includes an antenna array that includes at least two tightly coupled antennas at a first frequency. The apparatus further includes a memory configured to store a plurality of instructions. The plurality of instructions are configured to cause the processing circuitry to: acquire an antenna array port scattering matrix S at a first frequency; calculate a set of antenna array port orthogonal modes, wherein the set of antenna array port orthogonal modes include one or more of: an antenna array port characteristic modes, an antenna array port Inagaki modes, an antenna array port scattering modes, based on antenna array port scattering matrix S at a first frequency; order the characteristic modes at a first frequency based on a system performance criteria, the system performance criteria comprising one or more of: a maximum modal significance parameter α, a maximum radiation efficiency, a maximum SINR at the user, a minimum interference at the user, and a maximum capacity; derive antenna array port excitation coefficients at a first frequency from the antenna array port characteristic modes at a first frequency; and apply the antenna array port excitation coefficients as antenna array port excitation weights.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 18A illustrates an implementation of a feed network for transmitting or receiving two signals S1 and S2 associated with two Characteristic Modes, by applying the appropriate Characteristic Mode excitation coefficients (amplitude $a^i_j$, and phase $\phi^i_j$) to an antenna array, via use of combiner/splitter network according to embodiments of the present disclosure.

FIG. 18B illustrates an implementation of a Current Sheet Antenna or Tightly Coupled Array for transmitting or receiving two signals S1 and S2 associated with two characteristic modes, by applying the appropriate Characteristic Mode excitation coefficients (amplitude $a^i_j$, and phase $\phi^i_j$) to an antenna array, via use of a power combiner/splitter network according to embodiments of the present disclosure;

DETAILED DESCRIPTION

Figure 1:
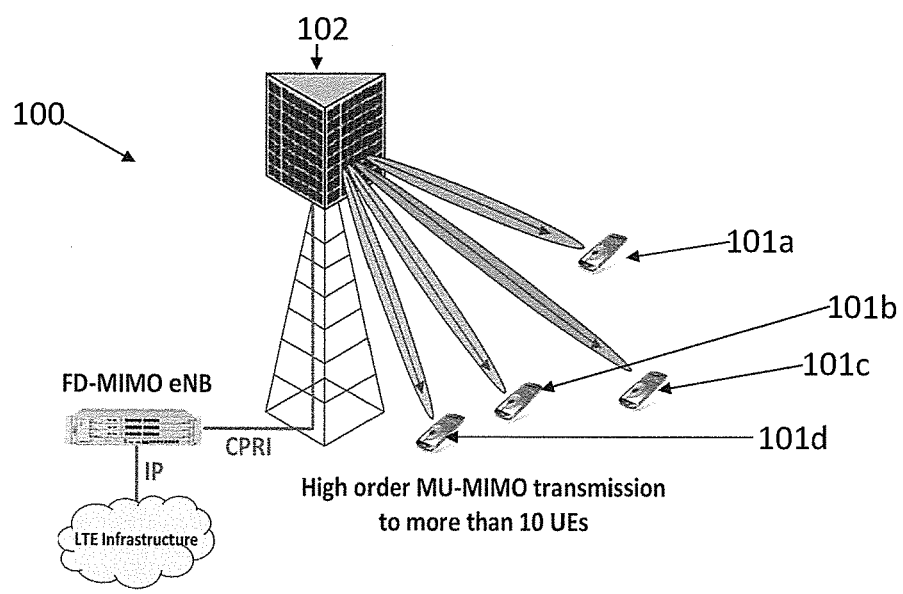
FIG. 1 illustrates an FD-MIMO (Full Dimension MIMO) base station along with user equipment according to embodiments of the present disclosure.

FIGS. 1 through 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged MIMO system.

The following documents and standards descriptions are hereby incorporated into the present disclosure as if fully set forth herein: Xin Li; Zaiping Nie, "Mutual coupling effects on the performance of MIMO wireless channels," Antennas and Wireless Propagation Letters, IEEE, vol. 3, no. 1, pp. 344, 347, December 2004 (REF 1); Morris, M. L.; Jensen, M. A., "Network model for MIMO systems with coupled antennas and noisy amplifiers," Antennas and Propagation, IEEE Transactions on, vol. 53, no. 1, pp. 545, 552, January 2005 (REF 2); Tzanidis, I; Setel K; Volakis J. L; "UWB Low-Profile Tightly Coupled Dipole Array with Integrated Balun and Edge Terminations", Antennas and Propagation, IEEE Transactions on, 2013 (REF 3); Doane, J. P.; Setel K; Volakis J. L; "Matching Bandwidth Limits for Arrays Backed by a Conducting Ground Plane", Antennas and Propagation, IEEE Transactions on, vol. 61, issue 5, pp. 2511-2518, 2013 (REF 4); F. Khan, LTE for 4G Mobile Broadband, Cambridge University Press, 2009 (REF 5); S. Loyka and G. Tsoulos, "Estimating MIMO System Performance Using the Correlation Matrix Approach," IEEE Communications Letter, vol. 6, no. 1, January 2002 (REF 6); P. S. Kildal and K. Rosengren, "Correlation and Capacity of MIMO Systems and Mutual Coupling, Radiation Efficiency, and Diversity Gain of Their Antennas: Simulations and Measurements in a Reverberation Chamber," IEEE Communications Magazine, vol. 42, no. 12, December 2004 (REF 7); A. H. Wheeler, "Simple relations derived from phased-array antenna made of an infinite current sheet," IEEE Trans. On Antennas and Propagation, vol. 13, no. 4, 1965 (REF 8); B. Munk, Finite Antenna Arrays and FSS, John Wiley, 2003 (REF 9); D. M. Pozar, "General relations for a phased array of printed antennas derived from infinite current sheets," IEEE Trans. On Antennas and Propagation, vol. 33, no. 5, 1985 (REF 10); Salman, D. Psychoudakis, J. L. Volakis, L. M. Paulsen, and J. B. West, "Broadband bowtie-shaped current sheet antenna array," IEEE International Symposium on Antennas and Propagation (APSURSI), 2011 (REF 11); I. Tzanidis, K. Sertel, and J. L. Volakis, "Characteristic Excitation Taper for Ultrawideband Tightly Coupled Antenna Arrays," IEEE Transactions on Antennas and Propagation, vol. 60, no. 4, 2012 (REF 12); D. Manteuffel and R. Martens, "A Concept for MIMO Antennas on Small Terminals Based on Characteristic Modes," 2011 International Workshop on Antenna Technology (iWAT), 2011 (REF 13); E. Safin, R. Martens, D. Manteuffel, "Modal Source Reconstruction Based on Radiated Far-Field for Antenna Design," 6th European Conference on Antenna and Propagation (EUCAP), 2011 (REF 14); R. F. Harrington, "Characteristic Modes for Antennas and Scatters," in Numerical and Asymptotic Techniques in Electromagnetics, ed. By R. Mittra, Springer-Verlag, 1975 (REF 15); and F. D. Flaviis, "Multiantenna Systems for MIMO Communications," Morgan & Claypool publishers, 2008 (REF 16).

Certain MIMO antenna architectures have been based on antenna arrays of resonant elements spaced by at least $\lambda/2$. This antenna element spacing aims to minimize mutual coupling between array elements, which is generally thought to reduce system capacity. A $\lambda/2$ spacing might be acceptable for base station arrays comprised of a small number of elements, for example 2H×8V (2 columns×8 rows). However, for a MIMO system comprised of maybe one hundred antenna elements, the resulting form factor would be prohibitive for installation on a realistic base station platform.

Additionally, on a user equipment (UE), such as mobile phones, the available space is even less and antenna size and placement is a big challenge. Performing MIMO on these small platforms is a big challenge and could require transition to high frequencies, such as frequencies >30 GHz, where the antenna array physical size becomes small enough to fit on a mobile phone. At these higher frequencies, being able to install the antenna array on-chip could minimize feed line loss and enhance antenna control.

To shrink the antenna array size, both the element size and the element spacing have to be decreased. But determining whether decreasing element size and the element spacing is possible without compromising any of the MIMO gains may lie in the observation that mutual coupling between array elements may not be a problem if the array can be designed such that the power can radiate efficiently from each element. Furthermore, a recent study shows that mutual coupling might not harm, but even enhance the system capacity under certain circumstances (See REF 1 and REF 2).

Embodiments of the present disclosure provide a novel approach for MIMO antenna array design. That is, instead of trying to minimize the naturally occurring mutual coupling, embodiments of the present disclosure take advantage of it. This is achieved by a class of arrays referred to as "Tightly Coupled Arrays" (See REF 3 and REF 4) or Current Sheet Antennas (CSA). The key feature of Tightly Coupled Arrays is that very small antenna elements ($\lambda/10$) are packed very close to each other, to create a controlled amount of coupling.

These recent Tightly Coupled Arrays or Current Sheet Arrays showed several unique qualities that are of potential benefit for wireless and cellular communications. These advantageous qualities include the following:
(a) Very wide bandwidth—frequency bandwidths that exceed 4:1;
(b) Low profile (or low height)—spacing between antenna array and its associated electrical ground of one-tenth of a wavelength ($\lambda/10$);
(c) High antenna efficiency—radiation efficiencies greater than 50% across the frequency range of the antenna, even for on-chip antennas;
(d) Small array area/size—antenna array smaller than conventional antenna arrays; and
(e) CMOS compatible fabrication.

Current Sheet Arrays (CSA) have unique advantages for wireless communications if the CSA can be used for MIMO operations.

In CSA, the capacitive coupling among array elements cancels the inductive coupling to the nearby ground plane (REF 11). The negation of inductive coupling through capacitive coupling provides high radiation efficiency despite the close proximity of the antenna array to the ground plane. The combination of wide bandwidth, low profile, and high antenna efficiency all can be realized in a single antenna array by judicious design of the inter-element capacitance.

Any configuration of tightly coupled antenna elements can be considered a current sheet antenna. In embodiments of the present disclosure, the term Current Sheet Antenna (CSA) is used to describe any antenna array configuration of Tightly Coupled Antenna elements.

Although CSA antennas have the important advantages listed above, CSA antennas have a significant drawback in that CSA antennas appear not to support MIMO communications. As described above, MIMO systems require no or low correlation among the antenna elements in a MIMO array. However, practical CSA arrays utilize tight electrical coupling among antenna elements to achieve low profiles and wide bandwidths. This tight coupling induces strong correlation among the antenna elements that cause strong correlation among any previously independent signals carried by the antenna elements of a CSA. For a system where either a transmit MIMO array or receive MIMO array utilizes a CSA, the non-diagonal terms in the correlation matrix in Equation 2 (herein below) would be large and the upper bound on the system capacity, C, would be low. Consequently, CSA antennas would appear to be wholly unsuitable for MIMO applications. The apparent failure of CSA antennas to support MIMO communications is the critical problem addressed by embodiments of the present disclosure.

In fact, by introducing mutual coupling between array elements, the electric current I can "flow" from element to element across the antenna array and resonate at certain frequencies, forming modes that can radiate in an orthogonal fashion. These modes are referred to as Characteristic Modes, since they are characteristic of the antenna element spacing and shape, the overall antenna array size, shape, and the size and shape of the structure supporting or enclosing the antenna array. The amplitude and phase of those modes can be controlled at the antenna ports or feed locations to change the characteristic mode intensity and hence the antenna array radiation pattern. By applying different excitation coefficients (amplitude/phase) across the array elements, different modes can be formed, corresponding to beams which can carry orthogonal signals that can be directed to different users. Tightly Coupled Arrays are expected to decrease the size of MIMO systems by a factor of 4.

FIG. 1 illustrates an FD-MIMO (Full Dimension MIMO) system according to embodiments of the present disclosure. The embodiment of the PD-MIMO system 100 shown in FIG. 1 is for illustration only. Other embodiments could be used without departing from the scope of the present disclosure.

Recently, the new Multiple-Input-Multiple-Output (MIMO) system called the Full-dimensional MIMO (PD-MIMO) has shown great potential to improve the spectral efficiency of the current Long Term Evolution (LTE) networks. As shown in FIG. 1, the FD-MIMO system 100 applies a large number of antenna elements arranged in a two-dimensional manner at the Base-Station (BS) 102. Such planar array is capable of beamforming in both azimuth and elevation direction, and provides sufficient degrees of freedom to support high order MultiUser MIMO (MU-MIMO) to users 101*a*, 101*b*, 101*c*, and 101*d*. Although only four users 101*a*-101*d* are shown in FIG. 1, embodiments with more or less users could be used without departing from the scope of the present disclosure.

Nearly all modern wireless communications systems use antenna diversity and spatial multiplexing—typically referred to as multiple-input multiple-output (MIMO)—to increase data throughput and system capacity. A MIMO communications system consists of multiple transmitter and receiver antennas operated in a multi-path and fading propagation environment. A MIMO system is generally comprised of two units: A transmitting unit with multiple input ports, referred to as the transmitter, and a receiving unit, with multiple output ports, referred to as the receiver. The receiver can be a single unit with multiple ports, such as a single user employing multiple antennas, or multiple users, each employing one or more antennas.

Figure 2:
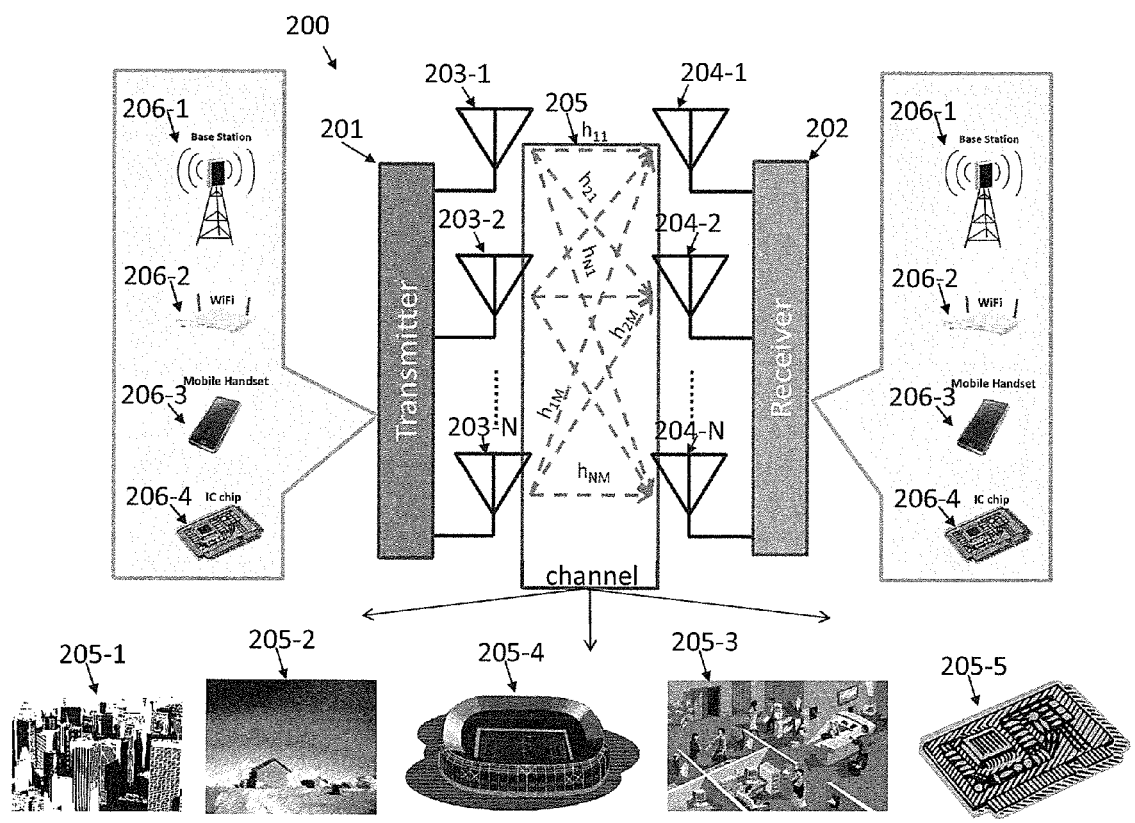
FIG. 2 illustrates a propagation environment between a transmitter antenna array and a receiver antenna array according to embodiments of the present disclosure.

FIG. 2 illustrates exemplary realizations 200 of a MIMO transmitter, receiver and a propagation environment between the transmitter and receiver according to embodiments of the present disclosure. The communication link propagation environment 205 between all transmitter and receiver antennas can be described as a set of links or channels, each having a channel coefficient, h. The embodiment of the propagation environment 205 shown in FIG. 2 is for illustration only. Other embodiments could be used without departing from the scope of the present disclosure.

In certain embodiments, the MIMO system 200 includes one transmitter unit 201 and one receiver unit 202. The transmitter 201 includes multiple active antennas 203-1, 203-2, . . . , 203-N, while the receiver antenna is comprised of multiple active antennas 204-1, 204-2, . . . , 204-N.

In certain embodiments, the transmitter units 201 and receiver units 202 assume various form factors. For example, the transmitter unit 201 and receiver unit 202 could be disposed on: a cellular base station 206-1, a WiFi node 206-2, a mobile handset 206-3, a IC chip 206-4, or the like.

The propagation environment 205 between the transmitter unit 201 and receiver unit 202 antennas can be described as a set of links, or channels, 205, between each transmit and receive antenna (REF 5). The total data capacity, C, in such a MIMO system (e.g., such as FD-MIMO system 100) can be expressed as:

$$C_{mean} = E\left[\log_2 \det\left(I + \frac{\rho}{M} HH^*\right)\right], \quad (1)$$

where E[•] indicates the expectation operation, log 2[•] is the logarithm base 2 operation, det[•] is the matrix determinate operation, I is the identity matrix, H is the channel matrix, H* is the transpose conjugate of the channel matrix, ρ is the average signal-to-noise ratio, and M is the maximum number of either the transmit or receive antennas or branches. In REF 6, it is shown that the upper bound on the data capacity can be determined from Equation 2 and expressed as:

$$C = \log_2 \det\left(I + \frac{\rho}{M} r\right), \quad (2)$$

where r is the correlation matrix among the different links in the communications system. The components of the correlation matrix are given by:

$$r_{ij} = \Sigma_k E[h_{ik} h^*_{jk}], \quad (3)$$

where $h_{ij}$ are the components of H.

As mentioned in REF 6, C can be used to estimate $C_{mean}$ without lengthy stochastic analyses or simulations. The effect of the correlation among the antennas, either on the transmit or receive side of the system, on the data capacity can be evaluated from Equation 2 assuming fixed linear channels with signal vectors composed of independent and equal power components. Equation 2 shows that the data capacity of the FD-MIMO system 100 may be limited by the correlation of the antennas (either at the transmit or receive side) with lower correlation providing higher data capacity than higher correlation. Therefore, the design of any MIMO antenna array should strive for no correlation ($r_{ij}=0$) or minimum correlation among antenna elements.

According to certain embodiments, the propagation environment 205 between the two antennas could be of various scales, including but not limited to: an urban environment 205-1, a rural environment 205-2, a stadium 205-3, an office 205-4 or even the microscopic space between two integrated circuit (IC) chips 205-5.

Various antenna types and antenna array configurations have been employed for MIMO communications systems. For all such present systems, the low correlation among the antenna elements imposes several restrictions on MIMO antenna arrays that often limit their performance or commercial application. Low correlation among antenna elements in a MIMO array require low mutual coupling among the antennas (See REF 7). Mutual coupling between antenna elements is dependent upon the electrical spacing between the antenna elements. Small spacing between elements (measured in units of wavelength) cause higher mutual coupling and high correlation among the antenna elements. To achieve low correlation (and low mutual coupling) the antenna elements must be placed far apart (typically λ/2 or λ) with the specific spacing depending upon the antenna types and their physical configurations. Since the spacing is dependent upon the wavelength, lower frequency MIMO arrays are larger in absolute dimensions than higher frequency arrays. This constraint in the spacing of MIMO antenna elements limits the size and compactness of devices, equipment, or products using MIMO communications.

Figure 3:
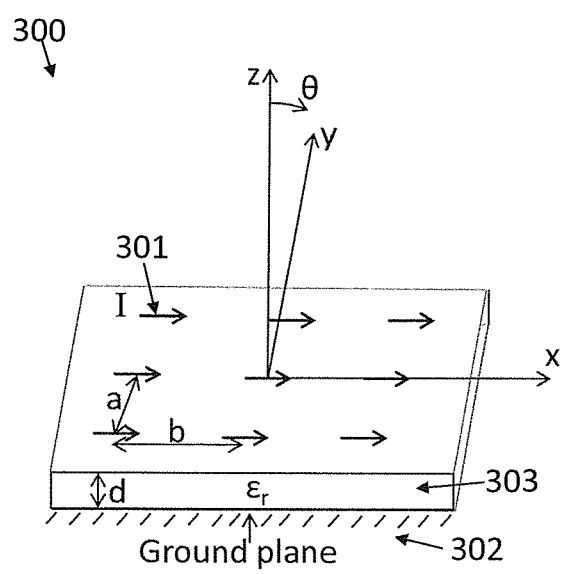
FIG. 3 illustrates a conceptual representation of a Current Sheet Antenna or a Tightly Coupled Array placed above a ground plane according to embodiments of the present disclosure.

FIG. 3 illustrates a conceptual representation of a Current Sheet Antenna or a Tightly Coupled Array placed above a ground plane according to embodiments of the present disclosure. The embodiment of the concept 300 of the CSA shown in FIG. 3 is for illustration only. Other embodiments could be used without departing from the scope of the present disclosure.

Tightly Coupled Array antennas, also referred to as Current Sheet Antennas (CSA), were initially introduced as analytical models for certain characteristics of antenna arrays (See REF 8, REF 9, and REF 10). The concept 300 of the CSA is an infinite sheet of electrical currents, I, 301 with the currents arranged such that the sheet produces particular radiation patterns. Wheeler in (REF 8) describes the CSA in the limiting case as many closely spaced small dipole antennas. Later, Munk in (REF 9) presented tightly coupled array of dipole antennas backed by a ground plane reflector 302 as a CSA. A dielectric substrate, $\in_r$, is typically used to support the dipole antennas and set the spacing, d, between the dipole array plane and the ground plane. More recently, CSAs composed of finite size, tightly coupled, linear antennas with ground plane reflectors have been investigated as described in REF 11 and REF 12.

Figure 4:
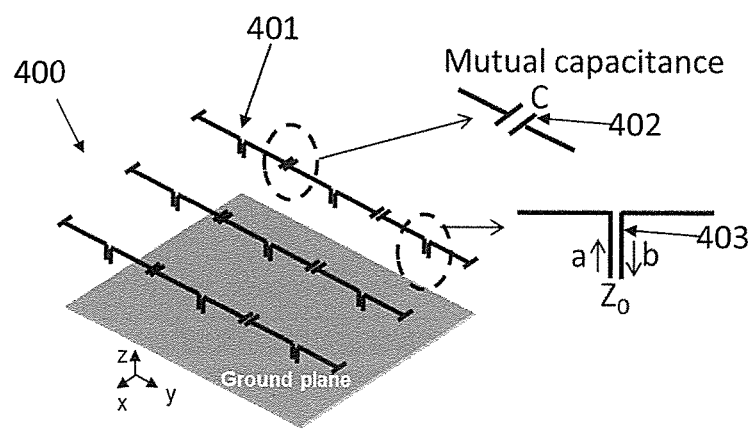
FIG. 4 illustrates a conceptual circuit representation of a Current Sheet Antenna or a Tightly Coupled Array of dipole antennas placed above a ground plane according to embodiments of the present disclosure.

FIG. 4 illustrates a conceptual circuit representation of a Current Sheet Antenna or a Tightly Coupled Array of dipole antennas placed above a ground plane according to embodiments of the present disclosure. The embodiment of the Mutual coupling is represented by mutual capacitance C, developed between the tips of adjacent dipole arms. Each dipole antenna is fed by a pair of balanced transmission lines (typically involving a transmission line section of balun/impedance transformer), with characteristic impedance $Z_0$. These feed lines are used to excite each antenna by an incident wave a. A reflected wave, b, is established as a result of any impedance mismatch between the antenna port impedance and the transmission line impedance.

An example of a tightly coupled dipole array or CSA, 400 is shown in FIG. 4. Mutual coupling between dipole antennas 401 can be controlled via adjusting mutual capacitance C 402 to alter the radiation characteristics such as, for example, the resonance frequency or the radiation pattern of a particular antenna mode. Each dipole antenna is fed by a set of balanced lines 403, which can have characteristic impedance $Z_0$. Feed lines 403 are used to establish an excitation or incident wave, a, of certain amplitude and phase and a respective reflected wave, b, as a result of impedance mismatch between the feed line 403 and the antenna input impedance. These CSAs showed several unique qualities that are of potential benefit for wireless and cellular communications. These advantageous qualities include the following:

(a) Very wide bandwidth—frequency bandwidths that exceed 4:1;
(b) Low profile (or low height)—spacing between antenna array and its associated electrical ground of one-tenth of a wavelength ($\lambda/10$);
(c) High antenna efficiency—radiation efficiencies greater than 50% across the frequency range of the antenna, even for on-chip antennas;
(d) Small array area/size—antenna array smaller than conventional antenna arrays;
(e) CMOS compatible fabrication.

CSA have unique advantages for wireless communications if they can be used for MIMO operations.

In current sheet arrays (CSA), the capacitive coupling among array elements cancels the inductive coupling to the nearby ground plane (See REF 11). The negation of inductive coupling through capacitive coupling provides high radiation efficiency despite the close proximity of the antenna array to the ground plane. The combination of wide bandwidth, low profile, and high antenna efficiency may all be realized in a single antenna array by judicious design of the inter-element capacitance.

Figure 5A:
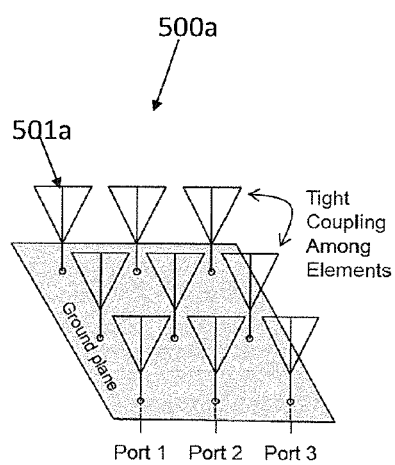
FIG. 5A illustrates a conceptual representation of a Tightly Coupled Antenna Array or Current Sheet Array with access to the antenna array physical ports according to embodiments of the present disclosure.

FIG. 5A illustrates a conceptual representation of a Tightly Coupled Antenna Array or Current Sheet Array with access to the antenna array physical ports, according to embodiments of the present disclosure. The embodiment of the antenna array configuration 500 shown in FIG. 5A is for illustration only. Other embodiments could be used without departing from the scope of the present disclosure. Each antenna element has a feeding port, through which an excitation can be applied to the antenna physical port. Tight element coupling means that the coupling coefficient measured by means of an S-parameter such as $S_{21}$, should be of magnitude of larger than >0.1 or >−10 dB. This is generally the case when antenna elements are spaced less than half wavelength at the operation frequency.

Any configuration of tightly coupled antenna elements can be considered a current sheet antenna. In the present disclosure, the term current sheet antenna is used to describe any antenna array configuration 500a of tightly coupled antenna elements 501a.

Figure 5B:
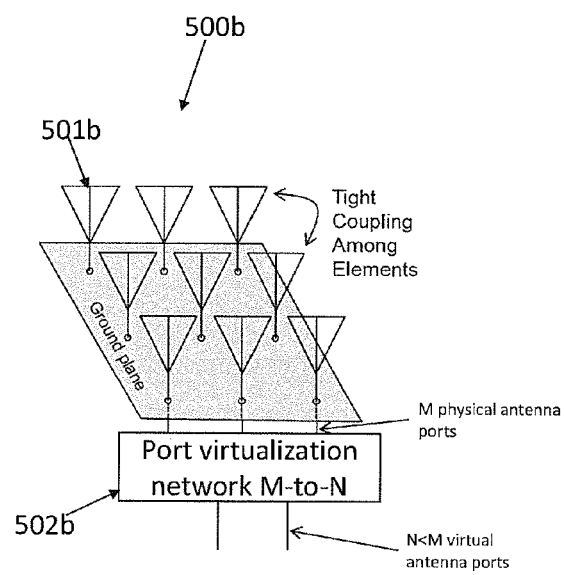
FIG. 5B illustrates a conceptual representation of a Tightly Coupled Antenna Array or Current Sheet Array with access to the antenna array virtual ports, according to embodiments of the present disclosure.

Alternatively, FIG. 5B illustrates a conceptual representation of a Tightly Coupled Antenna Array or Current Sheet Array with access to the antenna array virtual ports, according to embodiments of the present disclosure. The embodiment of the antenna array configuration 500b shown in FIG. 5B is for illustration only. Other embodiments could be used without departing from the scope of the present disclosure. Each antenna element has a feeding port, which by means of a virtualization network 502b is mapped to a virtual port, at which an excitation can be applied. Port virtualization network aims to reduce the number of antenna array physical ports, M, to a smaller number of antenna array virtual ports, N<M. In this invention disclosure, antenna array port can refer either to an antenna array physical port, or an antenna array virtual port.

Although CSA antennas have the important advantages listed above, a significant drawback is that CSA antennas appear not to support MIMO communications. As described above, MIMO systems require no or low correlation among the antenna elements in a MIMO array. However, practical CSA arrays utilize tight electrical coupling among antenna elements to achieve low profiles and wide bandwidths. This tight coupling induces strong correlation among the antenna elements that cause strong correlation among any previously independent signals carried by the antenna elements of a CSA. For a system where either the transmitting or receiving MIMO array utilizes a CSA, the non-diagonal terms in the correlation matrix in Equation 2 would be large and the upper bound on the system capacity, C, would be low. Another way to see the effect of mutual coupling among antenna elements on the system performance is through modeling of the MIMO system using a signal flow diagram (See REF 16). The equation relating the received signals, $b_R$, with respect to the transmitted signals, $b_0$, is given by:

$$b_R = (I - S_{RR}\Gamma_D)^{-1} H (I - \Gamma_S S_{TT})^{-1} b_0, \qquad (4)$$

where, I is the identity matrix, $S_{RR}$ is the receiver antenna array port scattering matrix, $\Gamma_D$ is a diagonal matrix containing the reflection coefficients between the receiver antenna array ports and the load impedances connected to them for modeling the receiver chain, H is the channel matrix, $\Gamma_S$ is a diagonal matrix containing the reflection coefficients between the transmitter antenna array ports and the source impedances connected to them representing the transmitter chain, $S_{TT}$ is the transmitter antenna array port scattering matrix. Mutual coupling between antenna array elements is represented by the off-diagonal elements of matrices $S_{RR}$ and $S_{TT}$. In absence of mutual coupling, $S_{RR}$ and $S_{TT}$ would be diagonal and therefore full rank, thus preserving the rank of the channel matrix H. But in presence of mutual coupling between antenna elements, $S_{RR}$ and $S_{TT}$ would be full matrices and therefore very likely not full rank matrices or full rank matrices but with several small eigenvalues, thereby reducing the rank or efficiency of the overall communication link, thus reducing capacity.

Consequently, CSA antennas would appear to be wholly unsuitable for MIMO applications. The apparent failure of CSA antennas to support MIMO communications is the critical problem addressed by embodiments of the present disclosure.

Figure 6:
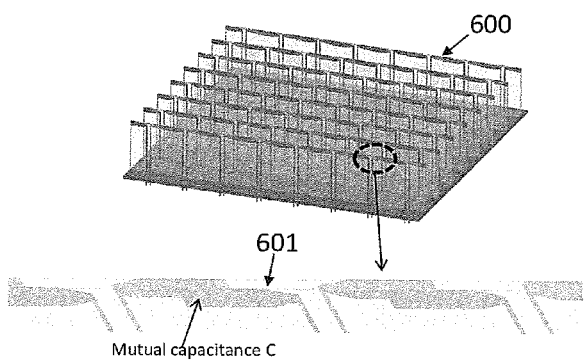
FIG. 6 illustrates an implementation of a linear Tightly Coupled Dipole Array over a ground plane according to embodiments of the present disclosure.

FIG. 6 illustrates an implementation of a linear Tightly Coupled Dipole Array over a ground plane according to embodiments of the present disclosure. The embodiment of the linear tightly coupled dipole Array 600 shown in FIG. 6 is for illustration only. Other embodiments could be used without departing from the scope of the present disclosure. Mutual coupling is controlled via mutual capacitance, C, between adjacent dipoles by controlling the length of the overlapping sections of their arms.

In certain embodiments, the transmitter or receiver array is a linear tightly coupled dipole array 600 placed over a ground plane, as shown in FIG. 6. The dipole elements are printed on printed circuit boards (PCB), which are arranged in rows placed perpendicularly to ground plane. Mutual coupling between dipole elements is controlled by overlapping sections of the dipole element arms 601.

Figure 7:
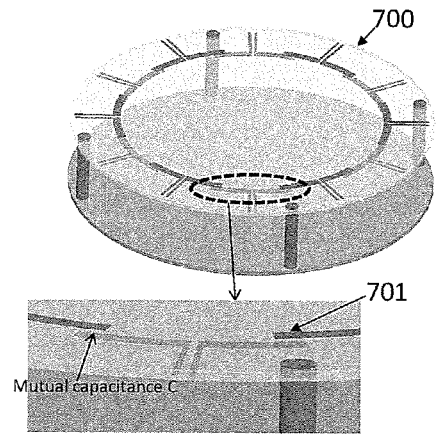
FIG. 7 illustrates an implementation of a circular Tightly Coupled Dipole Array over a ground plane according to embodiments of the present disclosure.

FIG. 7 illustrates an implementation of a circular Tightly Coupled Dipole Array over a ground plane according to embodiments of the present disclosure. Mutual coupling is controlled via mutual capacitance, C, between adjacent dipoles by controlling the length of the overlapping sections of their arms.

In certain embodiments, the transmitter or receiver array is a circular dipole array 700, as shown in FIG. 7. The dipole elements are printed on a printed circuit board (PCB), which are arranged in a plane parallel to the ground plane. Mutual coupling between dipole elements is controlled by overlapping sections of dipole element arms, 701.

Figure 8:
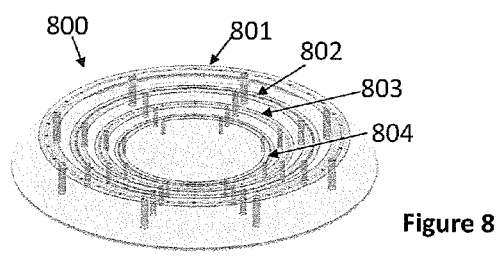
FIG. 8 illustrates an implementation of a circular Tightly Coupled Dipole Array over a ground plane according to embodiments of the present disclosure.

FIG. 8 illustrates an implementation of a circular Tightly Coupled Dipole Array over a ground plane according to embodiments of the present disclosure. The embodiment of the circular tightly coupled dipole array 800 shown in FIG. 8 is for illustration only. Other embodiments could be used without departing from the scope of the present disclosure. Multiple concentric circular arrays can be used to achieve broadband or multi-band characteristics. Mutual coupling is controlled via mutual capacitance, C, between adjacent dipoles by controlling the length of the overlapping sections of their arms.

In certain embodiments, the transmitter or receiver array is configured as an array of concentric circular dipole arrays 800, as shown in FIG. 8. The concentric circular arrays, 801, 802, 803, 804 can be placed at planes that have different distances from the ground plane, therefore allowing for multi-band or wideband operation. The dipole elements are printed on a printed circuit board (PCB), which are arranged in a plane parallel to the ground plane. Mutual coupling between dipole elements is controlled by overlapping sections of dipole element arms 701.

Figure 9:
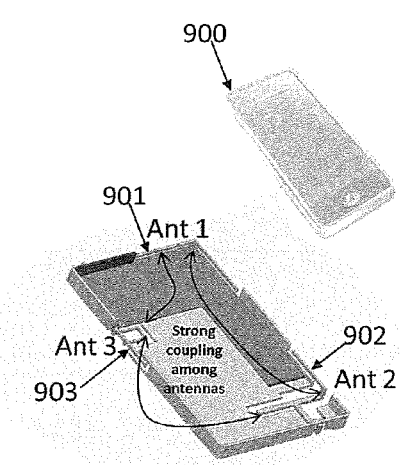
FIG. 9 illustrates a user equipment with three antennas placed along the edges of the metallic or plastic phone chassis according to embodiments of the present disclosure.

FIG. 9 illustrates a user equipment, such as a mobile phone, with three antennas placed along the edges of the metallic or plastic phone chassis according to embodiments of the present disclosure. The embodiment of the user equipment shown in FIG. 9 is for illustration only. Other embodiments could be used without departing from the scope of the present disclosure. The mutual coupling between the antennas and the phone chassis can be controlled in the design process so as to establish certain Characteristic Modes, with specific resonant frequencies and orthogonal radiation patterns.

In certain embodiments, the transmitter or receiver antenna array is a configuration of tightly coupled antenna elements that are not placed in a linear fashion, neither on a plane parallel to a ground plane. The UE can be configured as, for example, a mobile handset, such as a mobile phone 900, as shown in FIG. 9. In FIG. 9, tightly coupled antenna elements Antenna 1 901, Antenna 2 902, and Antenna 3 903 are disposed on or close to the mobile phone 900 chassis or casing of the mobile phone 900.

At cellular frequencies, the wavelength of operation is similar or larger in size than the mobile device and the antenna spacing. Therefore, according to FIG. 9, Antenna 1 901, Antenna 2 902 and Antenna 3 903 can experience strong mutual coupling, unless special decoupling networks are used, or special placement on the phone chassis is exercised. This mutual coupling can be used advantageously according to other embodiments of the present disclosure, for enhanced MIMO operation.

In certain embodiments, Antenna 1 901, Antenna 2 902 and Antenna 3 903 also strongly couple or induce currents to the phone chassis or casing. The mobile phone 900 casing can be metallic or plastic, or generally, of a material having a certain conductivity, permittivity and permeability.

Figure 10:
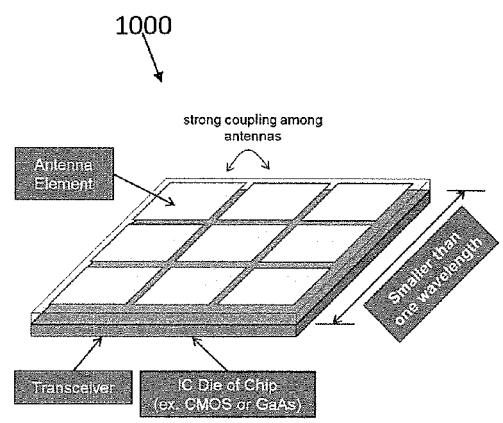
FIG. 10 illustrates a Tightly Coupled Antenna Array or a Current Sheet Array on a die of an integrated circuit (IC) chip (for example CMOS or GaAS) according to embodiments of the present disclosure.

FIG. 10 illustrates a Tightly Coupled Antenna Array or a Current Sheet Array on an integrated circuit (IC) die of a chip (for example CMOS or GaAS) according to embodiments of the present disclosure. The embodiment of the integrated circuit (IC) transceiver chip 1000 shown in FIG. 10 is for illustration only. Other embodiments could be used without departing from the scope of the present disclosure.

In certain embodiments, the transmitter or receiver antenna array is a configuration of tightly coupled antenna elements that are placed on the top surface of the die of an integrated circuit (IC) transceiver chip 1000, as shown, in FIG. 10. The antenna array can be formed by elements much smaller than the wavelength of operation or with antenna element spacing much smaller than the wavelength of operation, thereby with increased mutual coupling. Embodiments of the present disclosure are particularly useful in performing MIMO in this setting.

Figure 11:
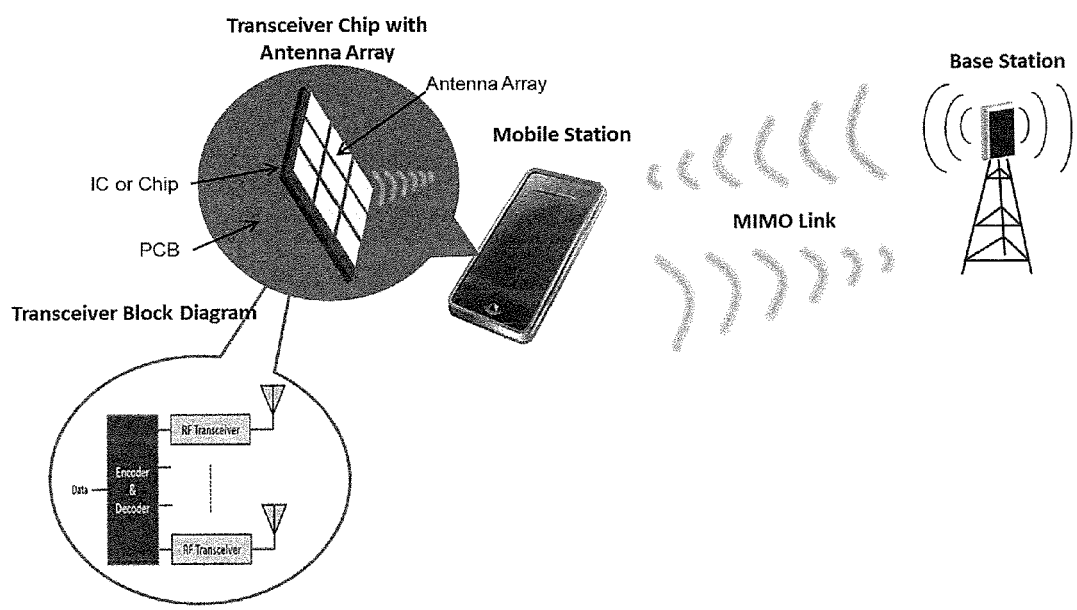
FIG. 11 illustrates an FD-MIMO telecommunications system including a user equipment and a base station according to embodiments of the present disclosure.

FIG. 11 illustrates an FD-MIMO telecommunications system including a user equipment, such as a mobile phone, and a base station according to embodiments of the present disclosure. The embodiment of the FD-MIMO telecommunications system 1100 shown in FIG. 11 is for illustration only. Other embodiments could be used without departing from the scope of the present disclosure.

In certain embodiments, the transceiver chip of FIG. 10, is disposed in a mobile handset, such as a mobile phone, and be used in a MIMO system for communication with a base station as shown in FIG. 11. The IC transceiver might also include the RF transmit/receive chain, and the base-band unit (signal encoder/decoder) as shown in FIG. 11.

Figure 12:
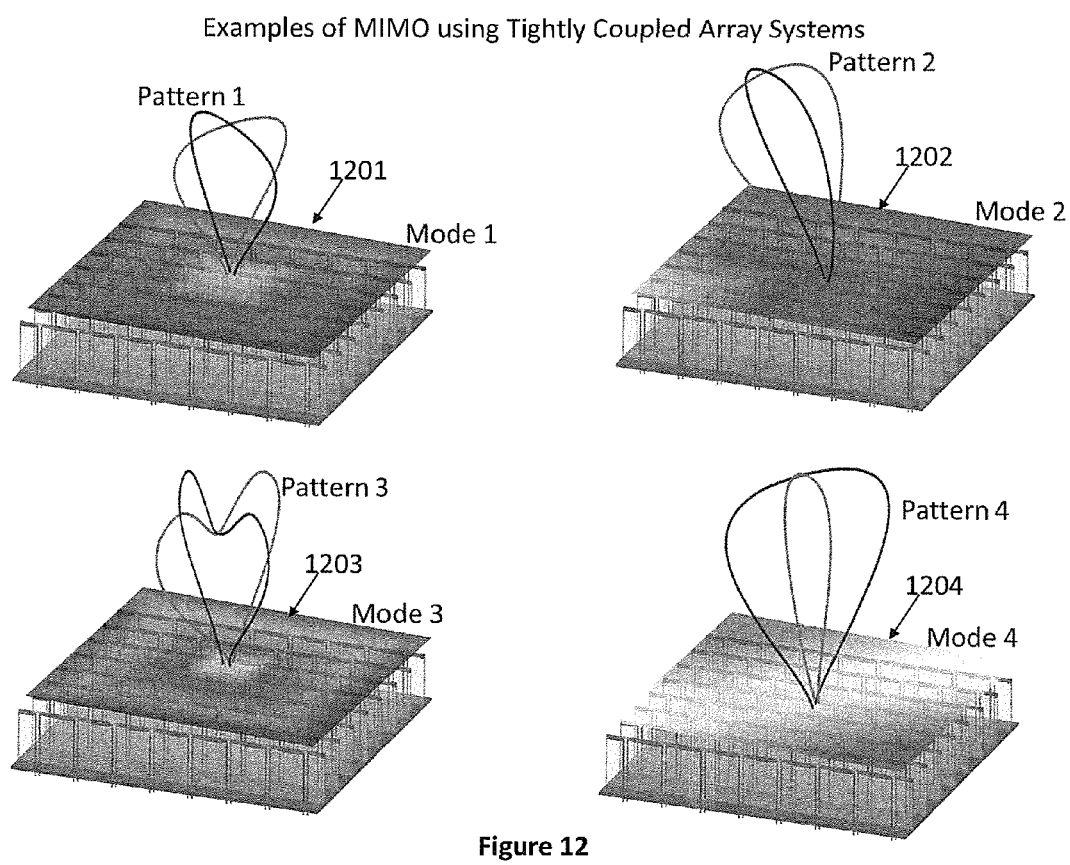
FIG. 12 illustrates exemplary current distributions of various Characteristic Modes on linear dipole arrays and their associated radiation patterns according to embodiments of the present disclosure.

FIG. 12 illustrates current distributions of various Characteristic Modes on linear dipole arrays and their associated radiation patterns according to embodiments of the present disclosure. The embodiments of the current distributions shown in FIG. 12 are for illustration only. Other embodiments could be used without departing from the scope of the present disclosure. The shaded region (light and dark color) on the array plane represents changes in the intensity of the modal current across the antenna array aperture.

In the example shown in FIG. 12, exemplary Characteristic Mode current distributions on a linear dipole array, such as the one shown in FIG. 6, are illustrated. As seen, Characteristic Mode 1, Mode 2, Mode 3, Mode 4 can be associated with a variety of current distributions on the antenna array aperture, each having different intensities across the array aperture, designated by the darker and lighter color shades. As a result, the different modes might be associated with different radiation patterns, which are orthogonal in the far-field, and can therefore be used for MIMO. For example, Mode 1 1201 is associated with a broadside radiation pattern with wide beamwidth. Mode 2 1202 is associated with a tilted radiation pattern, pointing to a substantially different direction than Mode 1. Mode 3 1203 can be associated with a pattern exhibiting multiple main lobes, and Mode 4 1204 might be associated with a radiation pattern having a narrow and wide beamwidth in two orthogonal planes.

Figure 13:
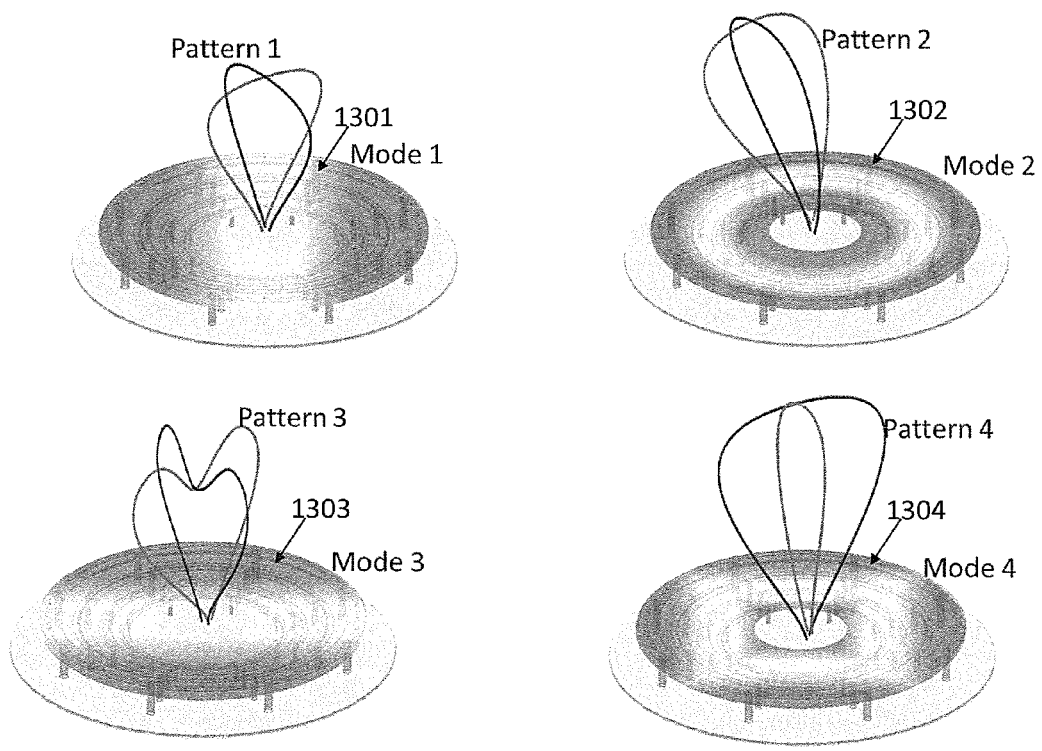
FIG. 13 illustrates exemplary current distributions of various Characteristic Modes on circular dipole arrays and their associated radiation patterns according to embodiments of the present disclosure.

FIG. 13 illustrates Characteristic Mode current distributions on an array of concentric circular dipole arrays, such as the one shown in FIG. 8, according to embodiments of the present disclosure. The embodiments of the current distributions shown in FIG. 13 are for illustration only. Other embodiments could be used without departing from the scope of the present disclosure. The shaded region (light and dark color) on the array plane represents changes in the intensity of the modal current across the antenna array aperture.

Characteristic Mode 1 1301, Mode 2 1302, Mode 3 1303 and Mode 4 1304 can be associated with a variety of current distributions on the antenna array aperture, each having different intensities across the array aperture, designated by the darker and lighter color shades. As a result, the different modes might be associated with different radiation patterns, which are orthogonal in the far-field, and can therefore be used for MIMO. For example, Mode 1 1301 is associated with a broadside radiation pattern with wide beamwidth. Mode 2

1302 is associated with a tilted radiation pattern, pointing to a substantially different direction than Mode 1. Mode 3 1303 can be associated with a pattern exhibiting multiple main lobes, and Mode 4 1304 can be associated with a radiation pattern having a narrow and wide beamwidth in two orthogonal planes.

In certain embodiments, the transmitter or receiver antenna array is configured as tightly coupled antenna elements that are not placed in a linear or circular fashion, neither on a plane parallel to a ground plane. Such a configuration can be a mobile handset, such as a mobile phone, 900, as shown in FIG. 9. In FIG. 9, tightly coupled antenna elements Antenna 1 901, Antenna 2 902, and Antenna 3 903 are disposed on, or close to, the mobile phone 900 chassis or casing of the mobile phone 900. Strong coupling might also occur between the antenna elements and the phone chassis, causing strong currents to be excited on the latter.

Figure 14:
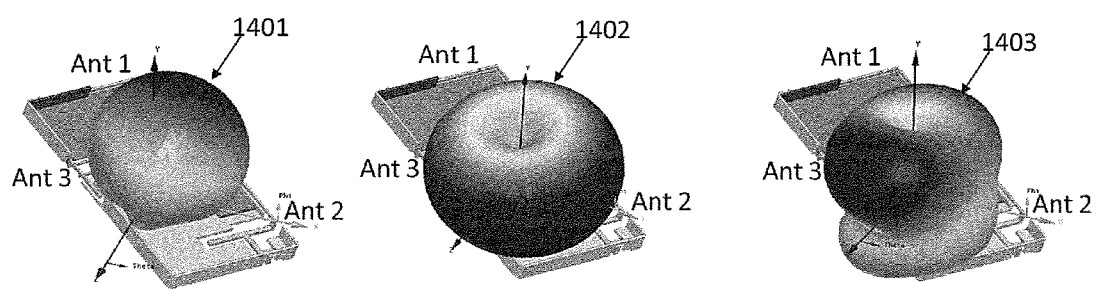
FIG. 14 illustrates exemplary Characteristic Mode radiation patterns associated with an antenna array placed on a metallic or plastic phone chassis according to embodiments of the present disclosure.

FIG. 14 illustrates exemplary Characteristic Mode radiation patterns associated with an antenna array placed on a metallic or plastic phone chassis according to embodiments of the present disclosure. The embodiments of the radiation patterns shown in FIG. 14 are for illustration only. Other embodiments could be used without departing from the scope of the present disclosure. By exciting the antenna elements with certain amplitude/phase weights, or excitation coefficients, as shown in the table, different radiation patterns corresponding to Characteristic Modes can be obtained. The phone or device chassis can be designed to assist with or provide extra characteristic modes by coupling to the antennas.

As seen in the example shown in FIG. 14, Antenna 1, Antenna 2 and Antenna 3 can be excited with different excitation coefficients or excitation weights, respectively w1, w2 and w3. The different weight combinations will result in exciting different characteristic modes. As a result, various radiation patterns can be obtained such as a first radiation pattern for a first characteristic mode 1401, a second radiation pattern for a second characteristic mode 1402, and a third radiation pattern for a third characteristic mode 1403. Table 1 is an example of the antenna array excitation weights used to excite characteristic mode 1, mode 2 and mode 3, associated respectively with radiation patterns 1401, 1402, and 1403.

TABLE 1

| Ant # | Excitation Coefficient | Mode 1 | Mode 2 | Mode 3 |
|---|---|---|---|---|
| Ant 1 | w1 | 0.7 | 1 | 0.2 |
| Ant 2 | w2 | 1 | 0.7 | 0.5 |
| Ant 3 | w3 | 0.4 | 0.8 | 1 |

Figure 15:
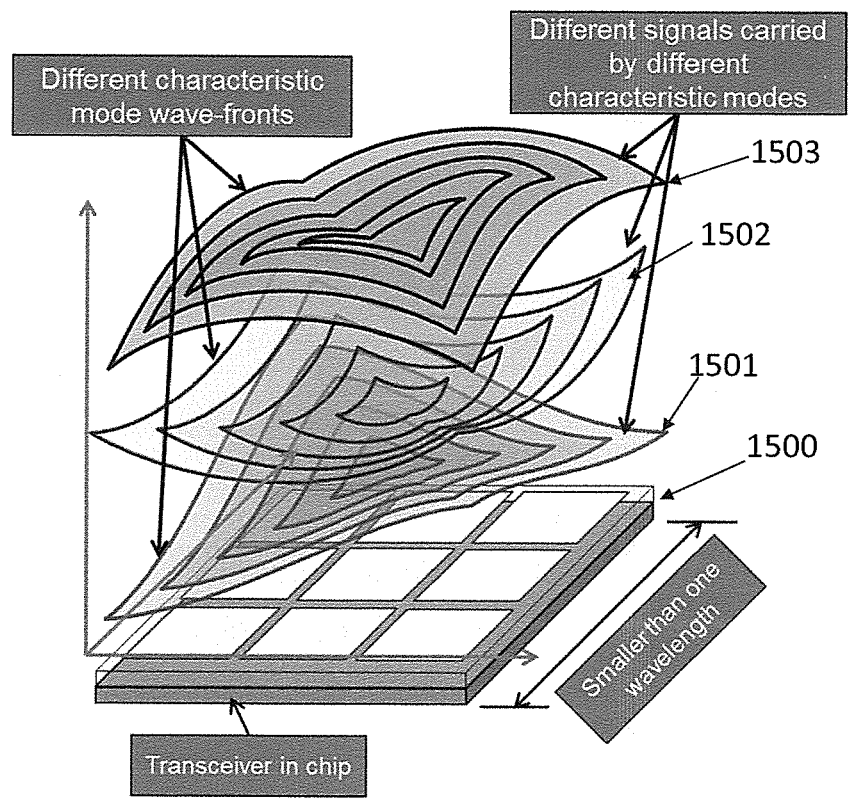
FIG. 15 illustrates exemplary Characteristic Mode currents and wave-fronts associated with a Tightly Coupled Array antenna or Current Sheet Antenna on a chip according to embodiments of the present disclosure.

FIG. 15 illustrates Characteristic Mode currents and wavefronts associated with a Tightly Coupled Array antenna or Current Sheet Antenna on a chip according to embodiments of the present disclosure. The embodiment of the currents and wave-fronts shown in FIG. 15 is for illustration only. Other embodiments could be used without departing from the scope of the present disclosure. The 3-D shaded region (light and dark color) represents changes in the field intensity of the various modes across the antenna array aperture.

In the example shown in FIG. 15, exemplary characteristic mode current or electric field distributions on or above the surface of a tightly coupled patch antenna array or current sheet array, placed on a the die of a transceiver integrated circuit (IC) 1500, are illustrated. The tightly coupled patch elements allow for excitation of various Characteristic Modes 1501, 1502 and 1503, which can carry different signals and radiate them in different, orthogonal radiation patterns, according to embodiments of the present disclosure.

Figure 16:
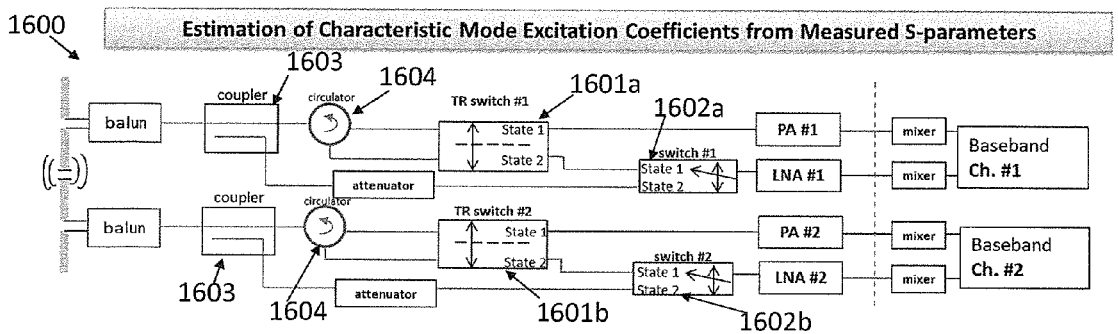
FIG. 16 illustrates a diagram of a system implementation for estimating the Characteristic Mode excitation coefficients of an antenna array by measuring the antenna arrays scattering matrix (S-matrix) and, converting it to an equivalent impedance matrix (Z-matrix) according to embodiments of the present disclosure.

FIG. 16 illustrates a diagram of a system implementation for estimating the Characteristic Mode excitation coefficients of an antenna array by measuring the antenna array port scattering matrix (S-matrix) and converting the S-matrix to an equivalent impedance matrix (Z-matrix) according to embodiments of the present disclosure. The embodiment of the system 1600 shown in FIG. 16 is for illustration only. Other embodiments could be used without departing from the scope of the present disclosure. The associated table provides an exemplary measurement sequence of the S-matrix for a two-element antenna array.

In certain embodiments, the antenna array port scattering matrix, S, is measured on-the-fly. An example of an implementation of a circuit to perform the S-matrix measurement is the system 1600 shown in FIG. 16 for an antenna array comprised of two elements only. The system 1600 is to be used for illustration purposes and should not be construed to limit the scope of this disclosure. The system 1600 can be easily scaled to include multiple antennas.

The system 1600, is configured to: use a combination of two-state switches 1601, namely TR switch #1 1601a, switch #2 1601b and switch #1 1602a and switch #2 1602b along with directional couplers 1603 and circulators 1604, enable a measurement of the antenna array port S-matrix, namely $S_{11}$, $S_{12}$, $S_{21}$, $S_{22}$. That is, system 1600 is configured to perform a measurement of the antenna array port S-matrix. Table 2 shows the measurement sequence to obtain $S_{11}$, $S_{12}$, $S_{21}$, and $S_{22}$.

TABLE 2

| Measurement Sequence | TR switch #1 | TR switch #2 | Switch #1 | Switch #2 |
|---|---|---|---|---|
| $S_{11}$ (PA #2 off, LNA #2 off) | State 1 | — | State 2 | — |
| $S_{22}$ (PA #1 off, LNA #1 off) | — | State 1 | — | State 2 |
| $S_{12}$ (PA #1 off, LNA #2 off) | State 2 | State 1 | State 1 | State 1 |
| $S_{21}$ (PA #2 off, LNA #1 off) | State 1 | State 2 | State 1 | State 1 |

If the system is properly phase calibrated, that is, all channels (RF chains) are phase adjusted to be in phase upon reaching the antenna terminals, the measured S-matrix phase reference obtained by the implementation of system 1600 can be placed at the antenna array ports.

In certain embodiments, the S-matrix is obtained at the antenna physical ports or at the antenna array virtual ports.

In certain embodiments, once the S-matrix is obtained, the S-matrix is stored in a memory and then converted to an array port impedance Z-matrix via the following conversion formula:

$$Z = Z_o^{-1/2}(I-S)^{-1}(I+S)Z_0^{1/2}, \quad (5)$$

where, $Z_0$ is a diagonal matrix containing the system impedance or normalization impedance for each antenna array port, and I is the identity matrix.

In certain embodiments, the antenna array port scattering matrix S (S-matrix) or the antenna array port impedance matrix Z (Z-matrix), can be directly acquired by numerical simulation of the antenna array by using a computational electromagnetics software, and stored in a memory for further post-processing.

After the antenna array port impedance matrix Z is obtained and stored in a memory, either by means of measurement or a-priori numerical simulation, according to embodiments of the present disclosure, calculation of the appropriate orthogonal modes to be used for MIMO can take place.

In certain embodiments, the antenna array port Characteristic Modes are extracted from the antenna array port impedance matrix Z and used for MIMO.

In certain embodiments, the antenna array port Inagaki modes are extracted from the antenna array port impedance matrix Z and used for MIMO.

In certain embodiments, the antenna array port eigenmodes are extracted from the antenna array port scattering matrix S and used for MIMO.

In certain embodiments, the calculation of the antenna array port excitation coefficients are calculated with the following process. First the antenna array port impedance matrix Z is obtained. Matrix Z is separated into real, R, and imaginary, X, components as:

$$Z = R + jX. \quad (6)$$

Thereafter, the desired eigenmodes and eigenvalues are obtained.

In certain embodiments, the desired orthogonal eigenmodes, I, are the antenna array port Characteristic Modes. These modes are obtained via the generalized eigenproblem:

$$XI = \lambda RI, \quad (7)$$

where, I are the eigenmodes and $\lambda$ are the corresponding eigenvalues.

In certain embodiments, the desired orthogonal eigenmodes, I, are the antenna array port Inagaki modes. These modes are obtained via the generalized eigenproblem:

$$Z^*ZI = \lambda RI, \quad (8)$$

where, I are the eigenmodes and $\lambda$ are the corresponding eigenvalues.

In certain embodiments, the desired orthogonal eigenmodes, I, are the antenna array port scattering eigenmodes. These modes are obtained via the eigenproblem:

$$SI = \lambda I, \quad (9)$$

where, I are the eigenmodes and $\lambda$ are the corresponding eigenvalues.

In certain embodiments, Equations. 7, 8, and 9 are evaluated at a first frequency.

In certain embodiments, Equations 7, 8, and 9 are evaluated at a first and second frequency.

In certain embodiments, Equations. 7, 8, and 9 are evaluated over a wideband frequency range.

In certain embodiments, after the eigenmodes, I, and corresponding eigenvalues are computed, the eigenmodes and eigenvalues can be stored in a memory for further post processing.

In certain embodiments, a modal intensity factor or modal significance parameter, $\alpha$, is calculated and stored in a memory. The purpose of $\alpha$, is to scale the modal eigenvalues $\lambda$, ranging in magnitude from $(0,\infty)$, in the range from $[0,1]$. An example of such a scaling conversion is given by:

$$\alpha = \frac{1}{1 + |\lambda|}. \quad (10)$$

where $\lambda$, is the eigenvalue of each mode I. In that fashion, modes that have high modal intensity factors, i.e. $\alpha > 0.7$, are associated with higher radiation efficiencies than modes which have lower modal intensities. Equation 10 is to be used as an example of scaling the modal eigenvalues $\lambda$, and not for limiting the scope of the present disclosure. It is understood that one could use an alternative scaling or normalization of the modal eigenvalues $\lambda$.

In certain embodiments, the modal significance parameter $\alpha$, is used to prioritize or order the eigenmodes.

Once the computation of eigenmodes I and eigenvalues $\lambda$ has been completed, the array port excitation coefficients or array port weights can be calculated.

In certain embodiments, either the Characteristic Modes or the Inagaki modes are chosen as the desired set of orthogonal array port eigenmodes. In that case the array port excitation coefficients can be calculated. The process outlined in embodiments of the present disclosure, of calculating the antenna array port excitation coefficients, is only used for exemplary purposes and not for limiting the scope of the present disclosure. It is understood that one could use an alternative mathematical calculation to extract the antenna array port excitation coefficients.

In certain embodiments, the voltage V at the antenna array ports is calculated via:

$$V = ZI. \quad (11)$$

where, Z is the antenna array port impedance matrix and I is the Characteristic or Inagaki eigenmode, respectively given by Equation 7 and Equation 8, that is desired to be excited. Voltage V is stored in a memory for further post processing.

In certain embodiments, the antenna array port excitation coefficients can be calculated and stored in a memory via:

$$a = \frac{V}{2\sqrt{Z_0}} + \frac{I\sqrt{Z_0}}{2}. \quad (12)$$

Figure 19:
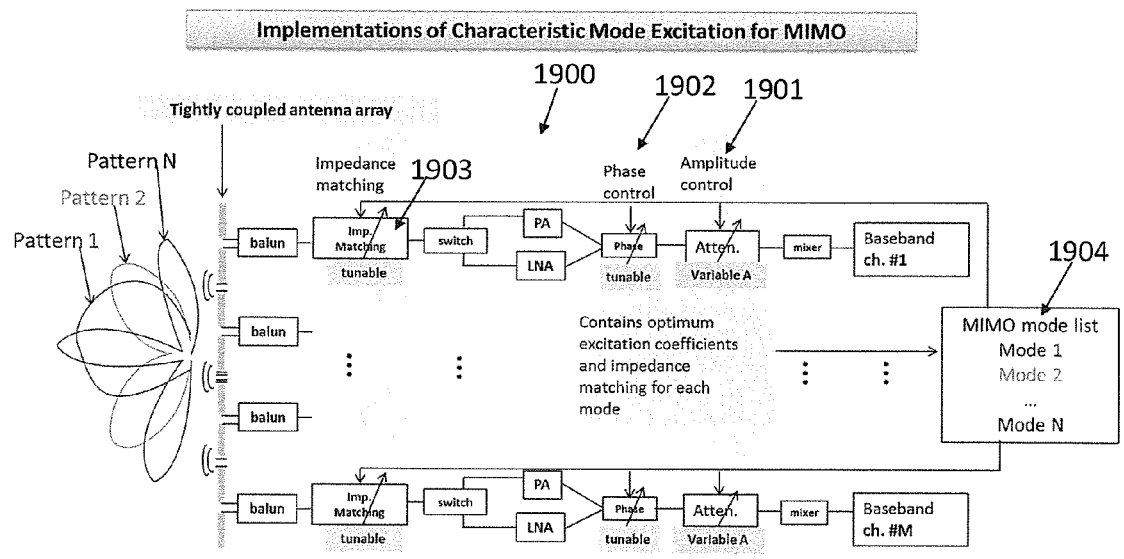
FIG. 19 illustrates an implementation for applying Characteristic Mode excitation coefficients (amplitude $a^i_j$, and phase $\phi^i_j$) and antenna array port system impedance $Z_{0,ij}$, at a hardware level in the RF domain according to embodiments of the present disclosure.

In certain embodiments, an optimum impedance matching condition is realized at the antenna array ports by means of an impedance matching circuit 1903, such as shown in FIG. 19. The impedance matching circuit 1903 converts the system impedance used on the right side of the impedance matching circuit 1903, typically set to 50Ω, to the desired impedance at the antenna array port on the left side of the matching circuit. The optimum impedance matching condition per antenna array port can be calculated and stored in a memory by:

$$Z_0 = \frac{V}{I}, \quad (13)$$

where V and I are given by Equation 11.

In certain embodiments, the Characteristic or Inagaki eigenmode, I, is a linear combination of orthogonal eigenmodes.

In certain embodiments, the array port scattering eigenmodes are chosen as the desired set of orthogonal array port eigenmodes, given by Equation 9. In that case the array port excitation coefficients can be calculated more readily via:

$$\alpha = I. \quad (12)$$

where the Characteristic or Inagaki eigenmode, I, is given by Equation 9.

In certain embodiments, the array port excitation coefficients (amplitude and phase) and impedance matching values are applied with certain amplitude and phase tolerance, such as 10% of the calculated value, without much loss of antenna radiation efficiency.

Figure 17:
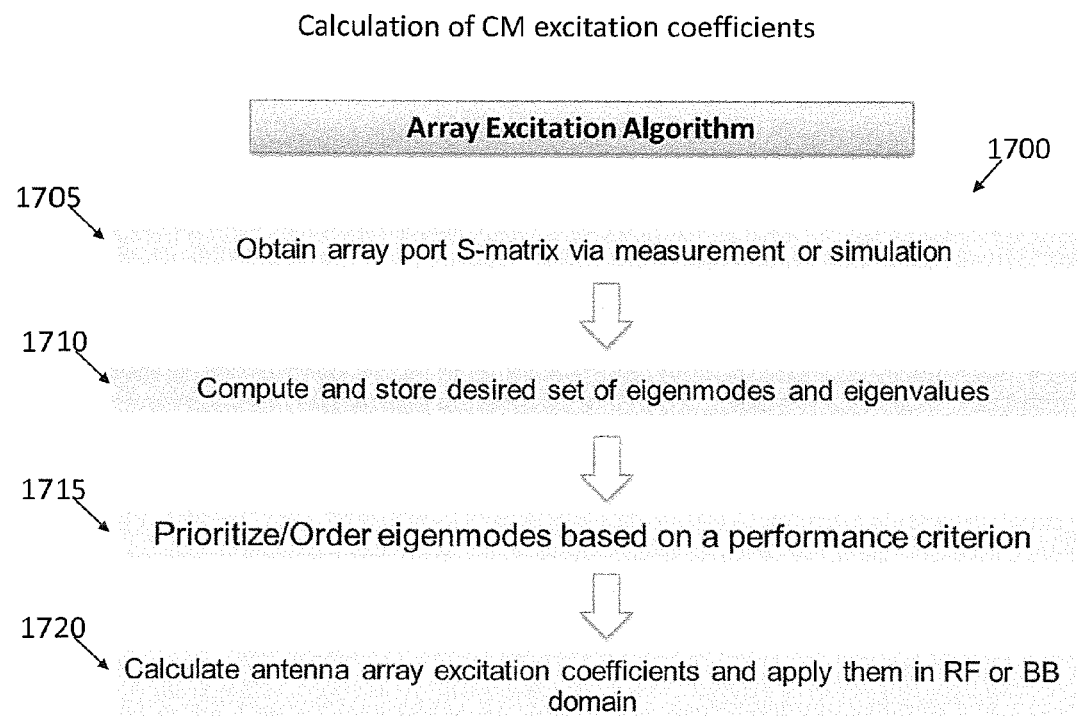
FIG. 17 illustrates an array excitation process according to embodiments of the present disclosure.

FIG. 17 illustrates an exemplary array excitation process according to embodiments of the present disclosure. The embodiments of the algorithm 1700 shown in FIG. 17 is for illustration only. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a mobile station. The algorithm 1700 for calculating and applying the desired antenna array port excitation coefficients associated with a certain set of orthogonal modes such as the array port Characteristic Modes or the Inagaki modes is outlined in FIG. 17. It is understood that this algorithm 1700 is an example of calculating and applying the desired antenna array port excitation coefficients associated with a certain set of orthogonal modes and should not be used to limit the scope of this invention disclosure.

The algorithm 1700 shows the four basic steps for determining antenna array port excitation coefficients. In operation 1705, array port S-matrix via measurement or simulation by estimating the antenna array port mutual coupling scattering matrix S (at the physical or virtual ports). In operation 1710, a desired set of eigenmodes and eigenvalues are computed and stored in a memory. In operation 1715, prioritizing/ordering and selecting the desired characteristic mode or modes to be applied to the antenna array ports (physical or virtual) based on a maximum modal significance parameter α, a maximum radiation efficiency, a maximum SINR at the user, a minimum interference at the user, a maximum system capacity, a maximum radiation efficiency, or a combination of the above, is performed. In operation 1720, an antenna array excitation table with the antenna excitation coefficients $a_{ij}$, (coefficient of antenna port i to excite a Characteristic Mode j), and associated port system impedances $Z_{0,ij}$ is calculated and the calculated antenna weights and characteristic impedances at RF or Baseband (BB) domains are applied.

Once the array port excitation coefficients and matching impedances have been determined and stored in a memory, the array port excitation coefficients and matching impedances can be applied to the antenna array ports (physical or virtual ports). An exemplary diagram showing an application of such a set of antenna array port excitation coefficients is shown in FIG. 18.

FIG. 18A illustrates an exemplary implementation of a feed network for transmitting or receiving two signals S1 and S2 associated with two Characteristic Modes, by applying the appropriate Characteristic Mode excitation coefficients (amplitude $a^i_j$, and phase $\phi^i_j$) to an antenna array, via use of combiner/splitter network according to embodiments of the present disclosure. The embodiment of the feed network 1800 shown in FIG. 18A is for illustration only. Other embodiments could be used without departing from the scope of the present disclosure.

In certain embodiments, signals S1 1803a and S2 1803b, are each assigned to an orthogonal mode 1 and 2, such as those described by embodiments of the present disclosure. A network of signal combiners/splitters 1804 distributes those signals to M antenna ports 1801. Signals S1 and S2 are assigned to an orthogonal mode, such as those described by embodiments of the present disclosure, by being multiplied with the corresponding array port excitation coefficient (amplitude and phase) or weight 1805. The weighted signals are then summed or combined via a network of signal summation blocks 1802 prior to transmission by the antenna terminals. A simplified representation of this process is illustrated in the example shown in FIG. 18B.

FIG. 18B illustrates an implementation of a Current Sheet Antenna or Tightly Coupled Array for transmitting or receiving two signals S1 and S2 associated with two characteristic modes, by applying the appropriate Characteristic Mode excitation coefficients (amplitude $a^i_j$, and phase $\phi^i_j$) to an antenna array, via use of a power combiner/splitter network according to embodiments of the present disclosure. The embodiment of the CSA shown in FIG. 18B is for illustration only. Other embodiments could be used without departing from the scope of the present disclosure.

In certain embodiments, the desired antenna array port excitation coefficients associated with a certain set of orthogonal modes, such as those described in embodiments of the present disclosure, can be applied to the antenna array ports in the RF or Base band (BB) domains.

FIG. 19 illustrates an implementation for applying Orthogonal Mode excitation coefficients (amplitude $a^i_j$, and phase $\phi^i_j$) and antenna array port system impedance $Z_{0,ij}$, at a hardware level in the RF domain according to embodiments of the present disclosure. The embodiment of the Characteristic Mode Excitation system 1900 shown in FIG. 19 is for illustration only. Other embodiments could be used without departing from the scope of the present disclosure.

In certain embodiments, the antenna array excitation coefficients are applied to the antenna array ports in the RF domain by the Orthogonal Mode Excitation system 1900. Characteristic Mode Excitation system 1900 is provided for exemplary purposes and other embodiments could be used without departing from the scope of the present disclosure. Characteristic Mode Excitation system 1900 can include an alternative hardware architecture to implement the desired antenna array port excitation coefficients.

The Characteristic Mode Excitation system 1900 includes basic implementation blocks that perform amplitude control 1901, related to the amplitude of the antenna array port excitation coefficient, phase control 1902, related to the phase of the antenna array port excitation coefficient, and impedance matching control 1903, related to the desired matching impedance for each antenna array element.

In certain embodiments, the desired orthogonal modes to be used for MIMO are stored in a lookup table 1904. A signal to be transmitted via a desired orthogonal mode, as described in certain embodiments of the present disclosure, is generated at baseband and up-converted to the RF domain, via a frequency mixer and appropriate filtering. The desired mode excitation coefficient (amplitude and phase) is applied at each RF chain, connected to each antenna port, via an amplitude control block 1901, such as a variable gain attenuator and a phase control block, such as a phase shifter 1902. The signal then is amplified and, after the appropriate impedance matching control block 1903, is propagated into space by the radiation pattern of the desired orthogonal mode.

Figure 20:
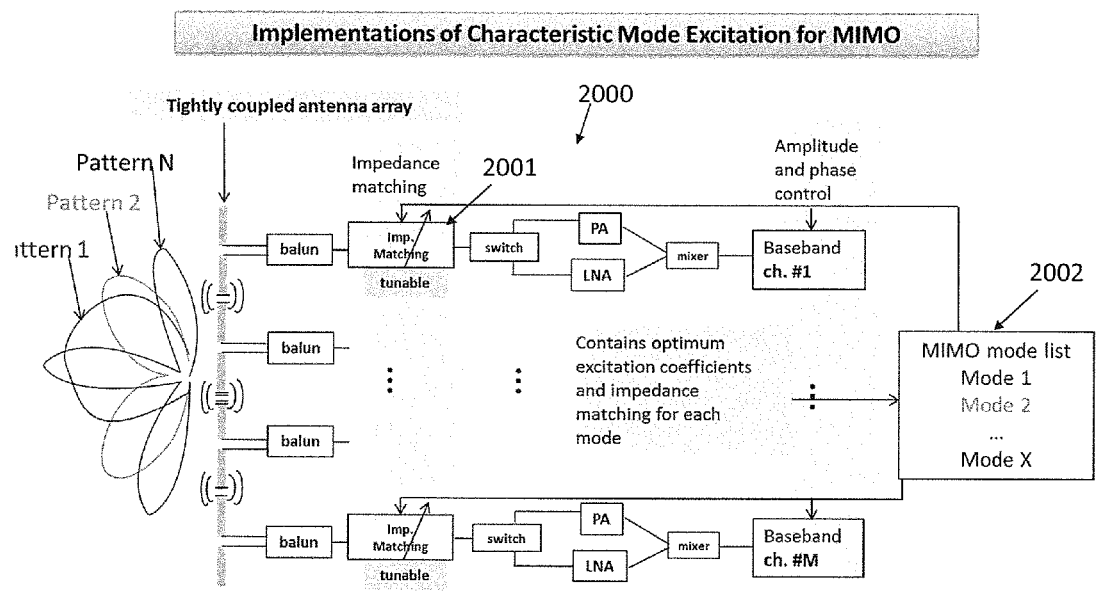
FIG. 20 illustrates an implementation for applying enforcing Characteristic Mode excitation coefficients (amplitude $a^i_j$, and phase $\phi^i_j$) at software level in the baseband domain, and antenna array port system impedance $Z_{0,ij}$, at a hardware level in the RF domain according to embodiments of the present disclosure.

FIG. 20 illustrates an implementation for applying enforcing Orthogonal Mode Excitation coefficients (amplitude $a^i_j$, and phase $\phi^i_j$), such as for example Characteristic Mode Excitation coefficients, at software level in the baseband domain, and antenna array port system impedance $Z_{0,ij}$, at a hardware level in the RF domain according to embodiments of the present disclosure. The embodiment of the Characteristic Mode Excitation system 2000 shown in FIG. 20 is for illustration only. Other embodiments could be used without departing from the scope of the present disclosure.

In certain embodiments, the antenna array excitation coefficients are applied to the antenna array ports in the Base band (BB) domain by the Characteristic Mode Excitation system 2000. Characteristic Mode Excitation system 2000 is provided for exemplary purposes and other embodiments could be used without departing from the scope of the present disclosure. Characteristic Mode Excitation system 2000 can include an alternative architecture to implement the desired antenna array port excitation coefficients.

In certain embodiments, the desired orthogonal modes to be used for MIMO are stored in a lookup table 2002. A signal to be transmitted via a desired orthogonal mode, as described in certain embodiments of the present disclosure, is generated at baseband and assigned the specified weight related to the array port excitation coefficient for the desired orthogonal mode. The signal is up-converted to the RF domain, via a frequency mixer and appropriate filtering. The signal is then amplified and, after the appropriate impedance matching control block 2001, is propagated into space by the radiation pattern of the desired orthogonal mode.

Various embodiments of the present disclosure can be implemented with any number of antenna types and antenna array configurations. Additionally, elements from each of the embodiments can be combined with one or more other embodiments of the present disclosure. For the purposes of this disclosure, the antenna arrays are described as tightly coupled arrays or current sheet antennas (CSA), however any type of antenna array in which the antenna elements have strong mutual coupling could be used without departing from the scope of the disclosure. Therefore, embodiments of the present disclosure can be implemented at nearly any carrier frequency (1 MHz to 300 GHz) but restricted to the operating frequency range of intended specified antenna array used with the embodiment. The number of characteristic modes that the antenna array will support will depend upon the electrical size of the antenna array and number of array elements. In general, the larger the antenna array (in size and number of elements), the more characteristic modes can be excited and the more independent information signals can be supported by an implementation of certain embodiments of the present disclosure. However, a MIMO antenna array according to certain embodiments of the present disclosure will be smaller than a MIMO array of a conventional design.

It is further understood that a wide range of methods and technologies can be used to physically implement embodiments of the present disclosure. The antenna arrays for certain embodiments can be constructed in planar, circular or irregular array grid, and by using nearly any fabrication technology: printed circuit board (PCB), stamped or formed metal, ceramic substrates with printed metal conductors (e.g., LTCC), integrated antennas in microelectronic devices (i.e., integrated circuits), antennas in IC packaging, and the like. As described in certain embodiments, excitation of the characteristic modes in the antenna array requires weighting of the signals at the antenna ports with complex coefficients. The complex weightings can be applied to the signals either in the RF domain using RF amplifiers or variable gain attenuators and RF phase shifters. Alternatively, the complex weightings can be applied in the base-band domain through digital signal processing techniques prior to the up- or down-conversion of the signals between RF and base-band domains. The exact implementation will depend upon the demands and restrictions of a particular application. The antenna element types that can be used with the certain embodiments include, but are not limited to: linear antennas, dipoles, monopoles, patch antennas, slot antennas, inverted F, planar inverted F, spiral antennas, log periodic, Yagi-Uda, substrate integrated waveguide antennas, dielectric resonator antennas, and variations on the aforementioned types.

Figure 21:
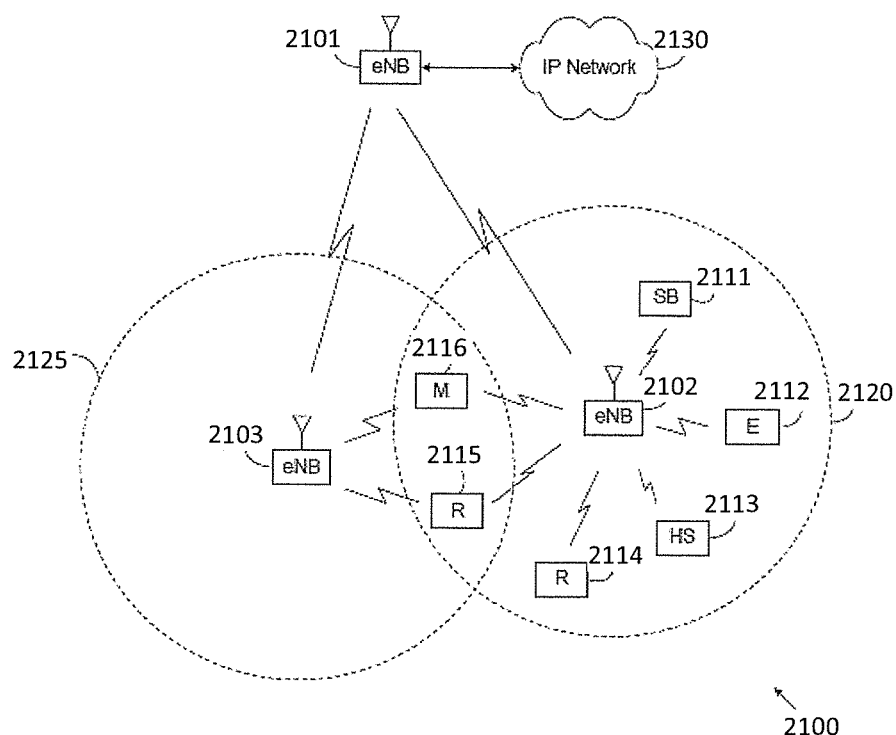
FIG. 21 illustrates an example wireless communication network according to this disclosure.

FIG. 21 illustrates an example wireless network 2100 according to this disclosure. The embodiment of the wireless network 2100 shown in FIG. 21 is for illustration only. Other embodiments of the wireless network 2100 could be used without departing from the scope of this disclosure. In certain embodiments, the wireless network 2100 includes or is configured as the FD-MIMO system 100.

As shown in FIG. 21, the wireless network 2100 includes an eNodeB (eNB) 2101, an eNB 2102, and an eNB 2103. The eNB 2101 communicates with the eNB 2102 and the eNB 2103. The eNB 2101 also communicates with at least one Internet Protocol (IP) network 2130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 2102 provides wireless broadband access to the network 2130 for a first plurality of user equipments (UEs) within a coverage area 2120 of the eNB 2102. The first plurality of UEs includes a UE 2111, which may be located in a small business (SB); a UE 2112, which may be located in an enterprise (E); a UE 2113, which may be located in a WiFi hotspot (HS); a UE 2114, which may be located in a first residence (R); a UE 2115, which may be located in a second residence (R); and a UE 2116, which may be a mobile device (M) like a cell phone, a wireless laptop, a wireless PDA, or the like. The eNB 2103 provides wireless broadband access to the network 2130 for a second plurality of UEs within a coverage area 2125 of the eNB 2103. The second plurality of UEs includes the UE 2115 and the UE 2116. In some embodiments, one or more of the eNBs 2101-2103 may communicate with each other and with the UEs 2111-2116 using 5G, LTE, LTE-A, WiMAX, or other advanced wireless communication techniques.

Dotted lines show the approximate extents of the coverage areas 2120 and 2125, which are shown as approximately circular for the purposes of illustration and explanation only. It should be clearly understood that the coverage areas associated with eNBs, such as the coverage areas 2120 and 2125, may have other shapes, including irregular shapes, depending upon the configuration of the eNBs and variations in the radio environment associated with natural and man-made obstructions.

As described in more detail below, various components of the network 2100 (such as the eNBs 2101-2103 and/or the UEs 2111-2116) include tightly coupled antenna arrays or support a miniaturization of MIMO systems via tightly coupled antenna arrays.

Although FIG. 21 illustrates one example of a wireless network 2100, various changes may be made to FIG. 21. For example, the wireless network 2100 could include any number of eNBs and any number of UEs in any suitable arrangement. Also, the eNB 2101 could communicate directly with any number of UEs and provide those UEs with wireless broadband access to the network 2130. Similarly, each eNB 2102-2103 could communicate directly with the network 2130 and provide UEs with direct wireless broadband access to the network 2130. Further, the eNB 2101, 2102, and/or 2103 could provide access to other or additional external networks, such as external telephone networks or other types of data networks.

Figure 22:
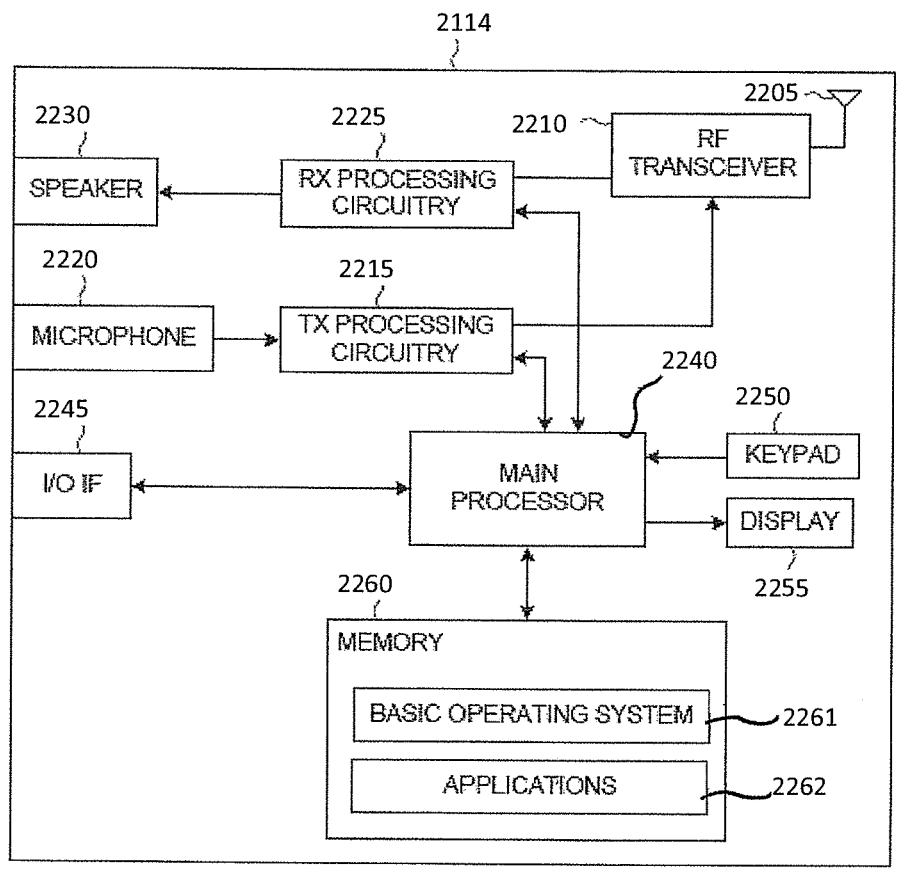
FIG. 22 illustrates an example user equipment (UE) according to this disclosure.

FIG. 22 illustrates an example UE 2114 according to this disclosure. The embodiment of the UE 2114 shown in FIG. 22 is for illustration only, and the other UEs in FIG. 21 could have the same or similar configuration. However, UEs come in a wide variety of configurations, and FIG. 22 does not limit the scope of this disclosure to any particular implementation of a UE.

As shown in FIG. 22, the UE 2114 includes an antenna 2205, a radio frequency (RF) transceiver 2210, transmit (TX) processing circuitry 2215, a microphone 2220, and receive (RX) processing circuitry 2225. The UE 2114 also includes a speaker 2230, a main processor 2240, an input/output (I/O) interface (IF) 2245, a keypad 2250, a display 2255, and a memory 2260. The memory 2260 includes a basic operating system (OS) program 2261 and one or more applications 2262.

The RF transceiver 2210 receives, from the antenna 2205, an incoming RF signal transmitted by an eNB or another UE. The RF transceiver 2210 down-converts the incoming RF signal to generate an intermediate frequency (IF) or baseband signal. The IF or baseband signal is sent to the RX processing circuitry 2225, which generates a processed baseband signal by filtering, decoding, and/or digitizing the baseband or IF signal. The RX processing circuitry 2225 transmits the processed baseband signal to the speaker 2230 (such as for voice data) or to the main processor 2240 for further processing (such as for web browsing data).

The TX processing circuitry 2215 receives analog or digital voice data from the microphone 2220 or other outgoing baseband data (such as web data, e-mail, or interactive video game data) from the main processor 2240. The TX processing circuitry 2215 encodes, multiplexes, and/or digitizes the outgoing baseband data to generate a processed baseband or IF signal. The RF transceiver 2210 receives the outgoing processed baseband or IF signal from the TX processing circuitry 2215 and up-converts the baseband or IF signal to an RF signal that is transmitted via the antenna 2205.

The main processor 2240 can include one or more processors or other processing devices and can execute the basic OS program 2261 stored in the memory 2260 in order to control the overall operation of the UE 2114. For example, the main processor 2240 could control the reception of forward channel signals and the transmission of reverse channel signals by the RF transceiver 2210, the RX processing circuitry 2225, and the TX processing circuitry 2215 in accordance with well-known principles. In some embodiments, the main processor 2240 includes at least one microprocessor or microcontroller.

The main processor 2240 is also capable of executing other processes and programs resident in the memory 2260 such as operations in support of communication with aggregation of FDD cells and TDD cells. The main processor 2240 can move data into or out of the memory 2260 as required by an executing process. In some embodiments, the main processor 2240 is configured to execute the applications 2262 based on the OS program 2261 or in response to signals received from eNBs, other UEs, or an operator. The main processor 2240 is also coupled to the I/O interface 2245, which provides the UE 2114 with the ability to connect to other devices such as laptop computers and handheld computers. The I/O interface 2245 is the communication path between these accessories and the main processor 2240.

The main processor 2240 is also coupled to the keypad 2250 and the display unit 2255. The operator of the UE 2114 can use the keypad 2250 to enter data into the UE 2114. The display 2255 may be a liquid crystal display or other display capable of rendering text and/or at least limited graphics, such as from web sites. The display 2255 could also represent a touchscreen.

The memory 2260 is coupled to the main processor 2240. Part of the memory 2260 could include a random access memory (RAM), and another part of the memory 2260 could include a Flash memory or other read-only memory (ROM).

As described in more detail below, the transmit and receive paths of the UE 2114 (implemented using the RF transceiver 2210, TX processing circuitry 2215, and/or RX processing circuitry 2225) include tightly coupled antenna arrays or support a miniaturization of MIMO systems via tightly coupled antenna arrays.

Although FIG. 22 illustrates one example of UE 2114, various changes may be made to FIG. 22. For example, various components in FIG. 22 could be combined, further subdivided, or omitted and additional components could be added according to particular needs. As a particular example, the main processor 2240 could be divided into multiple processors, such as one or more central processing units (CPUs) and one or more graphics processing units (GPUs). Also, while FIG. 22 illustrates the UE 2114 configured as a mobile telephone or smartphone, UEs could be configured to operate as other types of mobile or stationary devices. In addition, various components in FIG. 22 could be replicated, such as when different RF components are used to communicate with the eNBs 2101-2103 and with other UEs.

Figure 23:
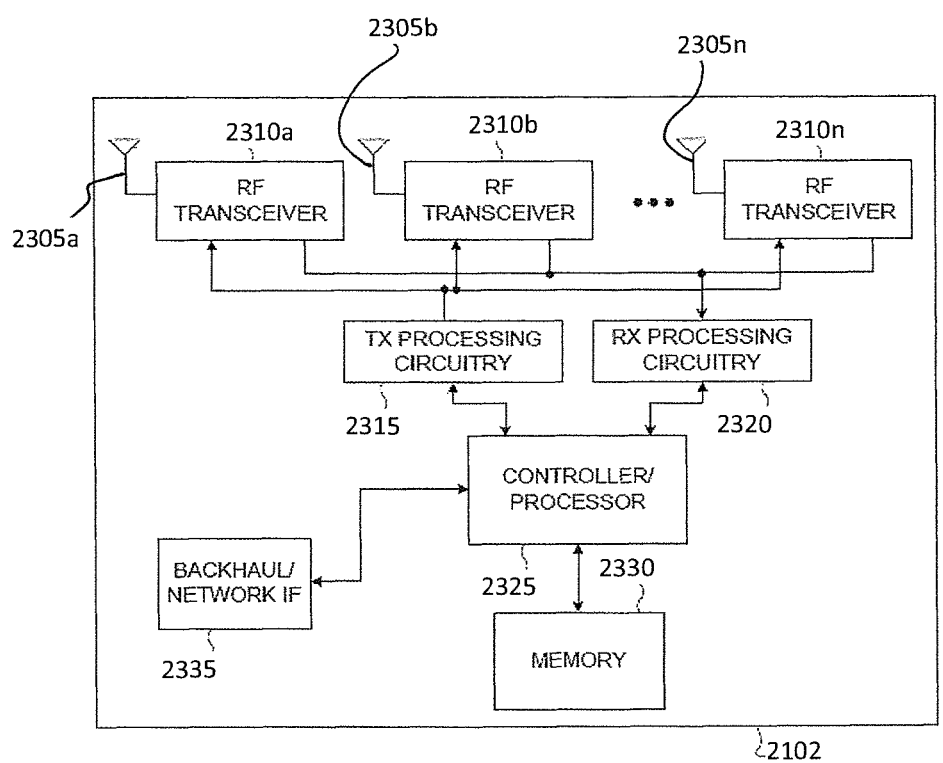
FIG. 23 illustrates an example eNodeB (eNB) according to this disclosure.

FIG. 23 illustrates an example eNB 2102 according to this disclosure. The embodiment of the eNB 2102 shown in FIG. 23 is for illustration only, and other eNBs of FIG. 21 could have the same or similar configuration. However, eNBs come in a wide variety of configurations, and FIG. 23 does not limit the scope of this disclosure to any particular implementation of an eNB.

As shown in FIG. 23, the eNB 2102 includes multiple antennas 2305a-2305n, multiple RF transceivers 2310a-2310n, transmit (TX) processing circuitry 2315, and receive (RX) processing circuitry 2320. The eNB 2102 also includes a controller/processor 2325, a memory 2330, and a backhaul or network interface 2335.

The RF transceivers 2310a-2310n receive, from the antennas 2305a-2305n, incoming RF signals, such as signals transmitted by UEs or other eNBs. The RF transceivers 2310a-2310n down-convert the incoming RF signals to generate IF or baseband signals. The IF or baseband signals are sent to the RX processing circuitry 2320, which generates processed baseband signals by filtering, decoding, and/or digitizing the baseband or IF signals. The RX processing circuitry 2320 transmits the processed baseband signals to the controller/processor 2325 for further processing.

The TX processing circuitry 2315 receives analog or digital data (such as voice data, web data, e-mail, or interactive video game data) from the controller/processor 2325. The TX processing circuitry 2315 encodes, multiplexes, and/or digitizes the outgoing baseband data to generate processed baseband or IF signals. The RF transceivers 2310a-2310n receive the outgoing processed baseband or IF signals from the TX processing circuitry 2315 and up-converts the baseband or IF signals to RF signals that are transmitted via the antennas 2305a-2305n.

The controller/processor 2325 can include one or more processors or other processing devices that control the overall operation of the eNB 2102. For example, the controller/processor 2325 could control the reception of forward channel signals and the transmission of reverse channel signals by the RF transceivers 2310a-2310n, the RX processing circuitry 2320, and the TX processing circuitry 2315 in accordance with well-known principles. The controller/processor 2325 could support additional functions as well, such as more advanced wireless communication functions. For instance, the controller/processor 2325 could support beam forming or directional routing operations in which outgoing signals from multiple antennas 2305a-2305n are weighted differently to effectively steer the outgoing signals in a desired direction. Any of a wide variety of other functions could be supported in the eNB 2102 by the controller/processor 2325. In some embodiments, the controller/processor 2325 includes at least one microprocessor or microcontroller.

The controller/processor 2325 is also capable of executing programs and other processes resident in the memory 2330, such as a basic OS. The controller/processor 2325 can move data into or out of the memory 2330 as required by an executing process.

The controller/processor 2325 is also coupled to the backhaul or network interface 2335. The backhaul or network interface 2335 allows the eNB 2102 to communicate with other devices or systems over a backhaul connection or over a network. The interface 2335 could support communications over any suitable wired or wireless connection(s). For example, when the eNB 2102 is implemented as part of a cellular communication system (such as one supporting 5G, LTE, or LTE-A), the interface 2335 could allow the eNB 2102 to communicate with other eNBs over a wired or wireless backhaul connection. When the eNB 2102 is implemented as an access point, the interface 2335 could allow the eNB 2102 to communicate over a wired or wireless local area network or over a wired or wireless connection to a larger network (such as the Internet). The interface 2335 includes any suitable structure supporting communications over a wired or wireless connection, such as an Ethernet or RF transceiver.

The memory 2330 is coupled to the controller/processor 2325. Part of the memory 2330 could include a RAM, and another part of the memory 2330 could include a Flash memory or other ROM.

As described in more detail below, the transmit and receive paths of the eNB 2102 (implemented using the RF transceivers 2310a-2310n, TX processing circuitry 2315, and/or RX processing circuitry 2320) include tightly coupled antenna arrays or support a miniaturization of MIMO systems via tightly coupled antenna arrays.

Although FIG. 23 illustrates one example of an eNB 2102, various changes may be made to FIG. 23. For example, the eNB 2102 could include any number of each component shown in FIG. 23. As a particular example, an access point could include a number of interfaces 2335, and the controller/processor 2325 could support routing functions to route data between different network addresses. As another particular example, while shown as including a single instance of TX processing circuitry 2315 and a single instance of RX processing circuitry 2320, the eNB 2102 could include multiple instances of each (such as one per RF transceiver).

Although various features have been shown in the figures and described above, various changes may be made to the figures. For example, the size, shape, arrangement, and layout of components shown in FIGS. 1 through 16 and 18-23 are for illustration only. Each component could have any suitable size, shape, and dimensions, and multiple components could have any suitable arrangement and layout. Also, various components in FIGS. 1 through 16 and 18-23 could be combined, further subdivided, or omitted and additional components could be added according to particular needs. Further, each component in a device or system could be implemented using any suitable structure(s) for performing the described function(s). In addition, while FIG. 17 illustrates various series of steps, various steps in FIG. 17 could overlap, occur in parallel, occur multiple times, or occur in a different order.

It can be also contemplated that various combinations or sub-combinations of the specific features and aspects of the embodiments may be made and still fall within the scope of the appended claims. For example, in some embodiments, the features, configurations, or other details disclosed or incorporated by reference herein with respect to some of the embodiments are combinable with other features, configurations, or details disclosed herein with respect to other embodiments to form new embodiments not explicitly disclosed herein. All of such embodiments having combinations of features and configurations are contemplated as being part of the present disclosure. Additionally, unless otherwise stated, no features or details of any of the embodiments disclosed herein are meant to be required or essential to any of the embodiments disclosed herein, unless explicitly described herein as being required or essential.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method to generate Multiple Input Multiple Output (MIMO) signals in a wireless propagation channel using antenna array port Orthogonal Modes, the method comprising:
   acquiring an antenna array port scattering matrix S at a first frequency;
   calculating, a set of antenna array port orthogonal modes, wherein the set of antenna array port orthogonal modes include antenna array port characteristic modes based on antenna array port scattering matrix S at a first frequency;
   ordering the port characteristic modes at a first frequency based on a system performance criteria, the system performance criteria comprising one or more of: a maximum modal significance parameter $\alpha$, a maximum radiation efficiency, a maximum SINR at the user, a minimum interference at the user, and a maximum capacity;
   deriving antenna array excitation coefficients at a first frequency from the antenna array port characteristic modes at a first frequency; and
   applying the antenna array excitation coefficients as antenna array port excitation weights.

2. The method of claim 1, where acquiring the antenna array port scattering matrix S comprises acquiring the antenna array port scattering matrix S by performing an a-priori antenna array numerical simulation.

3. The method of claim 1, where the antenna array port scattering matrix S is obtained at the antenna array virtual ports.

4. The method of claim 1, wherein the antenna array port orthogonal modes are the Inagaki modes.

5. The method of claim 1, wherein the antenna array port orthogonal modes are the eigenmodes of the antenna array port S matrix.

6. The method of claim 1, wherein calculating the antenna array port orthogonal modes comprises calculating the antenna array port orthogonal modes at a first frequency and second frequency.

7. The method of claim 1, wherein calculating the antenna array port orthogonal modes comprises calculating the antenna array port orthogonal modes over a wideband frequency range.

8. The method of claim 1, wherein ordering the orthogonal modes comprises ordering the orthogonal modes according to one or more of: a maximum modal significance parameter $\alpha$, a maximum antenna array radiation efficiency, a maximum SINR at the user, a minimum interference at the user, a maximum system capacity, and a maximum radiation efficiency.

9. An apparatus comprising: processing circuitry configured to generate Multiple Input Multiple Output (MIMO) signals in a wireless propagation channel using antenna array port orthogonal modes: an antenna array comprising at least two tightly coupled antennas at a first frequency, a memory configured to store a plurality of instructions, wherein the plurality of instructions are configured to cause the processing circuitry to:

acquire an antenna array port scattering matrix S at a first frequency;

calculate a set of antenna array port orthogonal modes, wherein the set of antenna array port orthogonal modes include antenna array port characteristics modes, array port Inagaki modes, array port scattering matrix modes, based on antenna array port scattering matrix S at a first frequency;

order the antenna array port orthogonal modes at a first frequency based on a system performance criteria, the system performance criteria comprising one or more of: a maximum modal significance parameter a, a maximum radiation efficiency, a maximum SINR at the user, a minimum interference at the user, and a maximum capacity;

derive antenna array excitation coefficients at a first frequency from the antenna array port orthogonal modes at a first frequency; and apply the antenna array excitation coefficients as antenna array port excitation weights.

10. The apparatus of claim 9, wherein the antenna array is configured in a transmitter mode.

11. The apparatus of claim 9, wherein ihe antenna array is configured in a receiver mode.

12. The apparatus of claim 9, wherein the antenna array is significantly coupled to the antenna array enclosure or casing.

13. The apparatus of claim 9, wherein the antenna array is coupled to a chassis or casing of the apparatus, and wherein the antenna array is configured to support a plethora of orthogonal modes, each one of the plethora of orthogonal modes resulting in a different radiation pattern.

14. The apparatus ot claim 9, where the antenna array is included in a die of an integrated circuit chip.

* * * * *